(12) United States Patent
Lee et al.

(10) Patent No.: US 11,326,939 B2
(45) Date of Patent: May 10, 2022

(54) ELECTRONIC DEVICE FOR MEASURING ILLUMINANCE, AND OPERATING METHOD THEREFOR

(71) Applicant: Samsung Electronics Co., Ltd., Gyeonggi-do (KR)

(72) Inventors: Yong Jin Lee, Seoul (KR); Hyunsu Kim, Gyeonggi-do (KR); Hwan Shim, Gyeonggi-do (KR); Wonkyu Lee, Gyeonggi-do (KR); Dawoon Jung, Gyeonggi-do (KR); Taeho Kim, Chungcheongbuk-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/760,536

(22) PCT Filed: Sep. 20, 2018

(86) PCT No.: PCT/KR2018/011085
§ 371 (c)(1),
(2) Date: Apr. 30, 2020

(87) PCT Pub. No.: WO2019/088448
PCT Pub. Date: May 9, 2019

(65) Prior Publication Data
US 2021/0215534 A1     Jul. 15, 2021

(30) Foreign Application Priority Data

Nov. 3, 2017   (KR) ......................... 10-2017-0145873

(51) Int. Cl.
*G01J 1/42*     (2006.01)
*G01J 1/02*     (2006.01)
*G01J 1/04*     (2006.01)

(52) U.S. Cl.
CPC ............ *G01J 1/4204* (2013.01); *G01J 1/0238* (2013.01); *G01J 1/0403* (2013.01); *G01J 1/0219* (2013.01); *G01J 1/0233* (2013.01)

(58) Field of Classification Search
CPC ...... G01J 1/4204; G01J 1/0238; G01J 1/0403; G01J 1/0219; G01J 1/0233
See application file for complete search history.

(56) References Cited

U.S. PATENT DOCUMENTS 7,728,316 B2 *   6/2010   Fadell .................... H04M 1/605
                                                            250/559.38
7,800,044 B1 *   9/2010   Kahn ...................... H04M 1/67
                                                            250/214 AL (Continued)

FOREIGN PATENT DOCUMENTS

EP      2 568 266       3/2013
JP      0962212         3/1997

(Continued)

OTHER PUBLICATIONS

European Search Report dated Nov. 10, 2020 issued in counterpart application No. 18871905.8-1020, 8 pages.

(Continued)

*Primary Examiner* — Seung C Sohn
(74) *Attorney, Agent, or Firm* — The Farrell Law Firm, P.C.

(57) ABSTRACT

Various embodiments of the present invention relate to: an electronic device capable of measuring illuminance by using an optical sensor and providing information on the measured illuminance to a user; and an operating method therefor. The electronic device according to various embodiments of the present invention comprises: a light emitting unit; a sensor having a light receiving unit; and a processor, wherein the processor is set so as to: sense a first illuminance outside the electronic device by using the sensor; emit light by using the (Continued)

light emitting unit when the first illuminance belongs to a predetermined range; confirm whether an external object is nearby by using the sensor based on at least the light emitted using the light emitting unit; determine the first illuminance as the illuminance outside the electronic device when the external object is not nearby; and estimate a second illuminance corresponding to the first illuminance by using a selected method based on at least context information related to the electronic device when the external object is nearby.

15 Claims, 28 Drawing Sheets

(56) References Cited

U.S. PATENT DOCUMENTS

| | | | | |
|---|---|---|---|---|
| 8,258,453 | B2* | 9/2012 | Rees | G01J 1/4204 250/214 AL |
| 8,766,162 | B2* | 7/2014 | Tanase | G06F 3/0304 250/214 AL |
| 2009/0121889 | A1 | 5/2009 | Lin et al. | |
| 2010/0127159 | A1 | 5/2010 | Watanabe | |
| 2014/0354567 | A1 | 12/2014 | Park et al. | |
| 2016/0048954 | A1 | 2/2016 | Cho et al. | |
| 2016/0199000 | A1 | 7/2016 | Giminez et al. | |
| 2017/0038250 | A1 | 2/2017 | Maass et al. | |
| 2017/0118854 | A1 | 4/2017 | Dumont et al. | |

FOREIGN PATENT DOCUMENTS

| | | |
|---|---|---|
| JP | 2010-199706 | 9/2010 |
| JP | 2011206585 | 10/2011 |
| JP | 2012248974 | 12/2012 |
| KR | 20100097682 | 10/2008 |
| KR | 101108959 | 1/2012 |
| KR | 20140140891 | 12/2014 |
| KR | 1020150081835 | 7/2015 |
| KR | 1020150085978 | 7/2015 |
| KR | 20160021633 | 2/2016 |

OTHER PUBLICATIONS

PCT/ISA/210 Search Report issued on PCT/KR2018/011085, pp. 5.
PCT/ISA/237 Written Opinion issued on PCT/KR2018/011085, pp. 5.
Indian Examination Report dated May 7, 2021 issued in counterpart application No. 202017022577, 5 pages.
Korean Office Action dated Mar. 30, 2022 issued in counterpart application No. 10-2017-0145873, 13 pages.

* cited by examiner

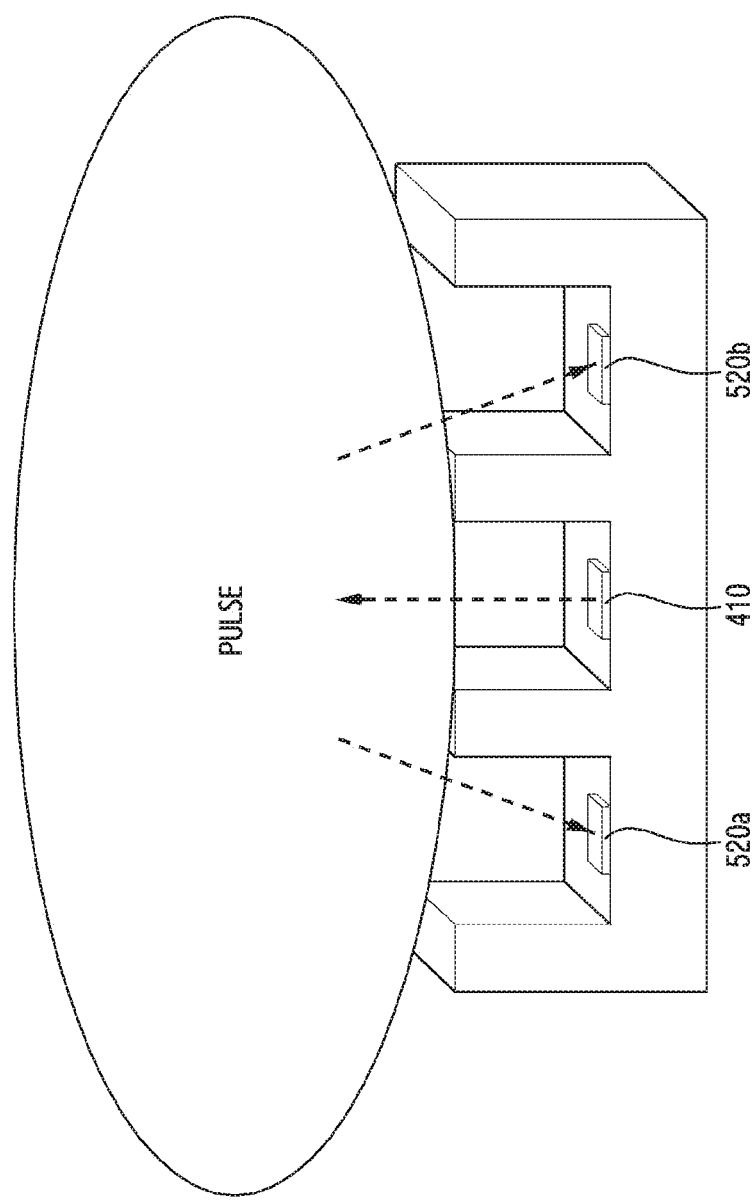

| SKIN REACTION TO SUNLIGHT | UV INDEX | | | |
| --- | --- | --- | --- | --- |
| | 3-5 | 6-7 | 8-10 | 11+ |
| Skin type I: Always burn, never tan | 10-15 min | 5-10 min | 2-8 min | 1-5 min |
| Skin type II: Burn easily, rarely tan | 15-20 min | 10-15 min | 5-10 min | 2-8 min |
| Skin type III: Occasionally burn, slowly tan | 20-30 min | 15-20 min | 10-15 min | 5-10 min |
| Skin type IV: Rarely burn, rapidly tan | 30-40 min | 20-30 min | 15-20 min | 10-15 min |
| Skin type V: Very rarely burn, always dark | 40-60 min | 30-40 min | 20-30 min | 15-20 min |

FIG. 20

ELECTRONIC DEVICE FOR MEASURING ILLUMINANCE, AND OPERATING METHOD THEREFOR

PRIORITY

This application is a National Phase Entry of PCT International Application No. PCT/KR2018/011085, which was filed on Sep. 20, 2018, and claims priority to Korean Patent Application No. 10-2017-0145873, which was filed on Nov. 3, 2017, the content of each of which is incorporated herein by reference.

TECHNICAL FIELD

The disclosure relates to an electronic device for measuring illuminance through an optical sensor and providing information on the measured illuminance to a user, and a method of operating the same.

BACKGROUND ART

According to a worldwide aging phenomenon and a change in a medical service paradigm from treatment to prevention, users of electronic devices have been further interested in receiving user-customized medical information and health information in order to improve the quality of life through healthy life extension.

As portable electronic devices such as smartphones have high performance, the electronic devices may sense surrounding environment information required to provide user-customized medical service through sensors embedded into the electronic devices. Particularly, the electronic device may sense illuminance through an optical sensor embedded into the electronic device.

Information on illuminance may be used to analyze various health states of the user (for example, depression and sleep states) and provide user-customized medical information and health information.

DISCLOSURE OF INVENTION

Technical Problem

When illuminance is measured using an optical sensor located on the front surface of an electronic device (for example, a watch-type wearable device), an illuminance value measured by the electronic device may not accurately indicate an illuminance value for a user. For example, when the front surface of the electronic device is covered by an external object (for example, a sleeve), the illuminance value measured by the electronic device cannot accurately indicate an illuminance value for a light to which the user is exposed. In this case, the electronic device needs to recognize that an incorrect illuminance value has been measured and calibrate the incorrectly measured illuminance value.

If there is no process for calibrating the incorrectly measured illuminance value, the electronic device cannot provide user-customized medical and health information, thereby causing inconvenience to the user.

Solution to Problem

In accordance with an aspect of the disclosure, an electronic device is provided. The electronic device includes: a sensor comprising a light emitter and a light receiver; and a processor electrically connected to the sensor, wherein the processor is configured to detect a first illuminance outside of the electronic device through the sensor, output a light through the light emitter when the first illuminance is within a predetermined range, identify whether an external object is in proximity through the sensor, based at least on the light output through the light emitter, determine the first illuminance as illuminance outside of the electronic device when the external object is not in proximity, and estimate a second illuminance corresponding to the first illuminance through a method selected based at least on context information related to the electronic device when the external object is in proximity.

In accordance with another aspect of the disclosure, a method of operating an electronic device is provided. The method includes: detecting a first illuminance outside of the electronic device; outputting a light when the first illuminance is within a predetermined range; identifying whether an external object is in proximity at least based on the output light; determining the first illuminance as illuminance outside of the electronic device when the external object is not in proximity; and estimating a second illuminance corresponding to the first illuminance through a method selected at least based on context information related to the electronic device when the external object is in proximity.

Advantageous Effects of Invention

An electronic device and a method of operating the same according to various embodiments can newly determine an illuminance value of a section in which it is determined that an illuminance value for a user is not correct, thereby providing accurate user-customized medical information and health information.

BRIEF DESCRIPTION OF DRAWINGS

FIGS. 5A and 5B illustrate the structure of the first sensor configured to measure illuminance according to various embodiments of the disclosure;

FIG. 20 illustrates a table in which an optimum outdoor stay time is determined based on a skin type of the user and a UV index according to various embodiments of the disclosure;

BEST MODE FOR CARRYING OUT THE INVENTION

Figure 1:
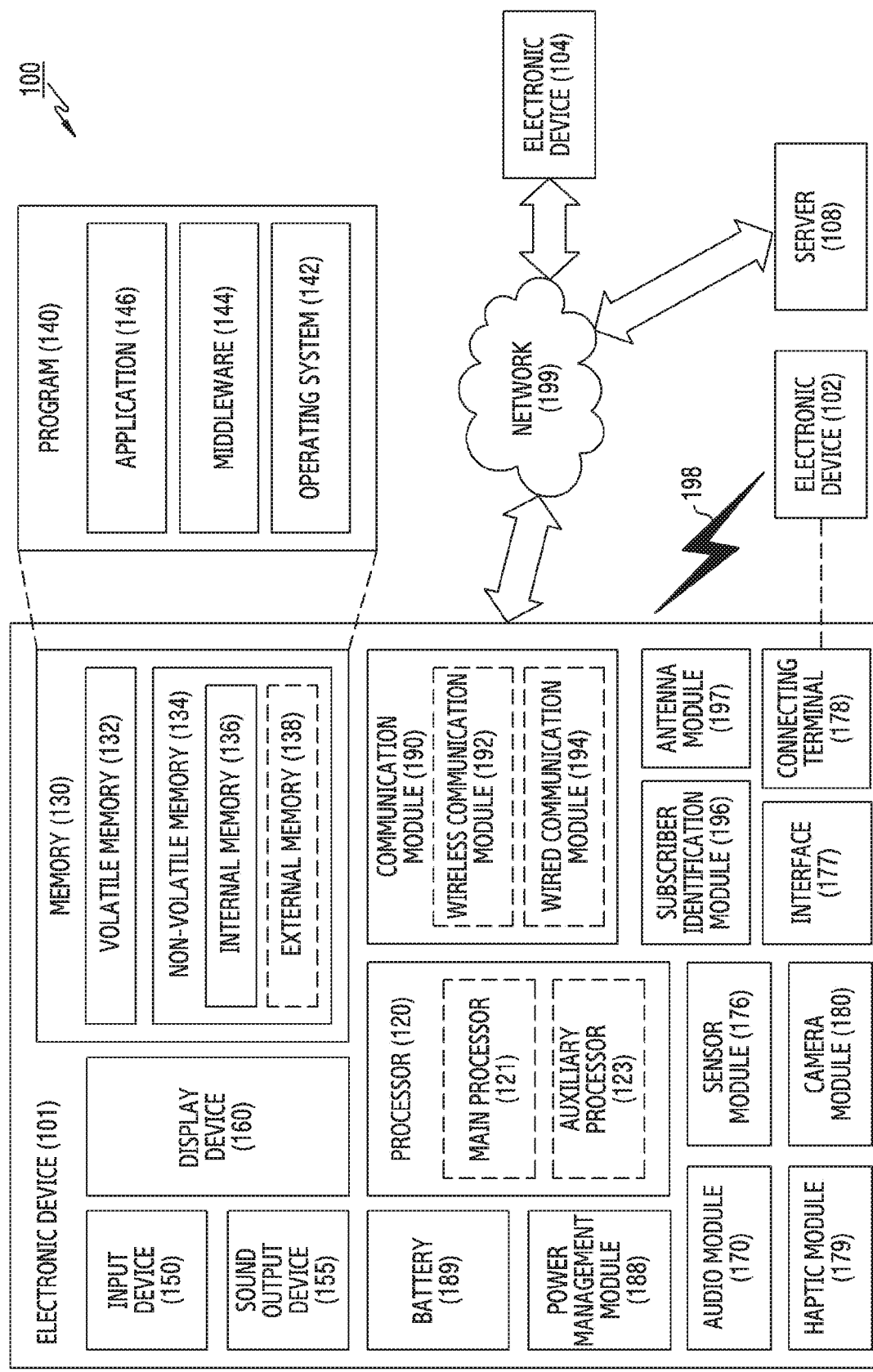
FIG. 1 is a block diagram of an electronic device within a network environment to measure illuminance according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., weirdly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network may be selected, for example, by the communication module 190 (e.g., the wireless communication module 192) from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
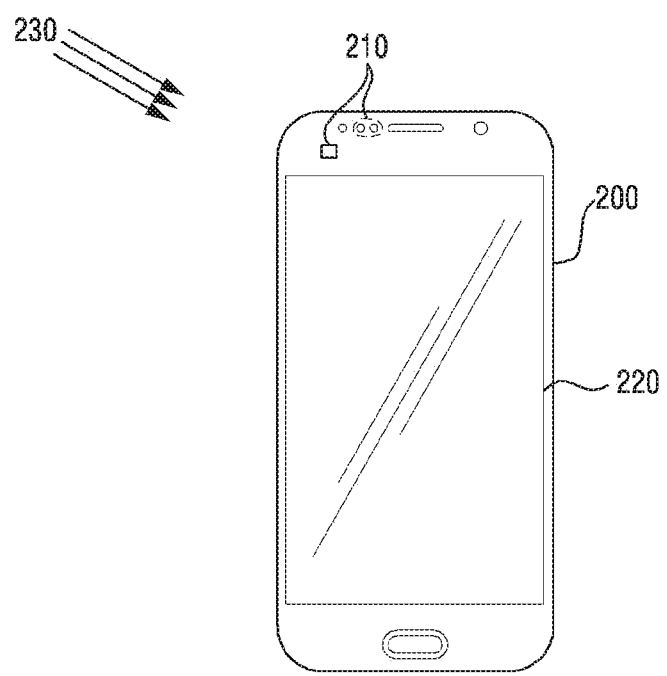
FIG. 2 illustrates an electronic device according to various embodiments of the disclosure.

FIG. 2 illustrates an electronic device according to various embodiments of the disclosure.

Referring to FIG. 2, an electronic device 200 according to various embodiments is illustrated.

According to an embodiment, the electronic device 200 may be the electronic device 101 illustrated in FIG. 1.

According to an embodiment, the electronic device 200 may be a device for detecting an ambient light 230 and measuring a brightness (hereinafter, referred to as illuminance) of the detected ambient light.

According to an embodiment, the ambient light may include a natural light and an artificial light. The natural light may be a visible ray.

According to an embodiment, the electronic device 200 may include one or more modules for measuring illuminance. According to an embodiment, one or more modules for measuring illuminance may be disposed on the front surface, rear surface, and one or more side surfaces of the electronic device 200. For example, a display 220 may be disposed on the front surface of the electronic device 200, and a first sensor 210 for measuring illuminance may be disposed on an upper part of the display 220. For example, the first sensor 210 may be disposed in at least one opening (for example, a second or third opening from the left side) among a plurality of openings located on the upper part of the display 220. One first sensor 210 may be disposed in two openings (second and third openings from the left side). In another example, the first sensor 210 may be disposed in a space between the plurality of openings and the display 220.

According to an embodiment, the first sensor 210 may include various forms of modules for measuring illuminance. The first sensor 210 may include at least one light receiver for detecting an ambient light. When the illuminance is equal to or smaller than a preset value, the first sensor 210 may include at least one light emitter to determine whether or not an external object is in proximity. The first sensor 210 may include resistance varying depending on illuminance. The first sensor 210 may measure illuminance by outputting a value of current or voltage varying depending on a value of resistance to a processor 620. For example, the first sensor 210 may be an optical sensor or an illuminance sensor.

Figure 3:
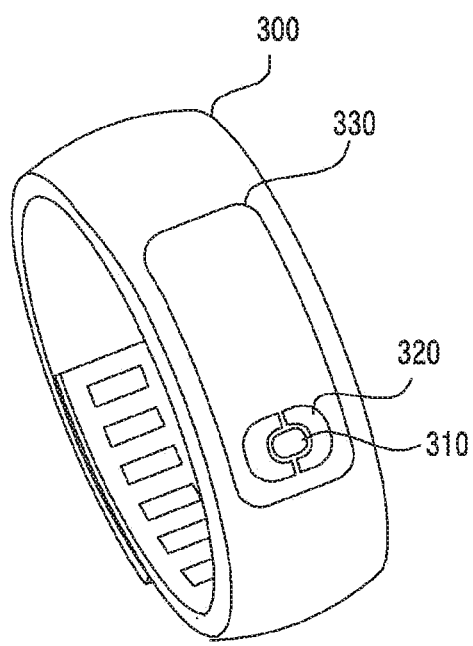
FIG. 3 illustrates an electronic device according to various embodiments of the disclosure.

FIG. 3 illustrates an electronic device according to various embodiments of the disclosure.

Referring to FIG. 3, an electronic device 300 according to various embodiments is illustrated.

According to an embodiment, the electronic device 300 may be a wearable device. The electronic device 300 may be a wearable device that can be worn on a user's body part. For example, the electronic device 300 may be a smart watch that can be worn on a user's wrist.

According to an embodiment, the electronic device 300 may include one or more first sensors 310 for detecting an embodiment light in front of the electronic device 300 and measuring a brightness of the detected ambient light, that is, illuminance. For example, the first sensor 310 may be an optical sensor or an illuminance sensor.

According to an embodiment, the electronic device 300 may include at least one electrode 320 disposed within a predetermined range from the first sensor 310. At least one electrode 320 may be configured to generate a pulse according to a predetermined period. The pulse generated by at least one electrode may be used to acquire user's biometric information (for example, ECG or bioimpedance).

According to an embodiment, the electronic device 300 may be paired with an external device (not shown). For example, the electronic device 300 may be a wearable device, and the external device may be a smart phone paired with the electronic device 300. The electronic device 300 may analyze the illuminance measured through the first sensor 310, provide the analyzed illuminance to the user, and transmit information on the measured and analyzed illuminance.

Figure 4A:
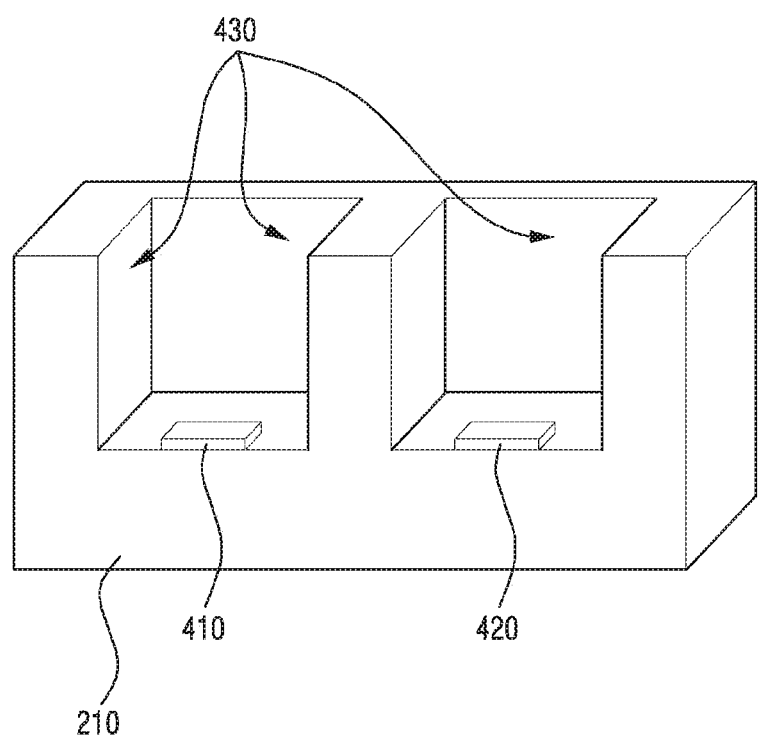
FIG. 4A illustrates the structure of a first sensor configured to measure illuminance according to various embodiments of the disclosure.
Figure 4B:
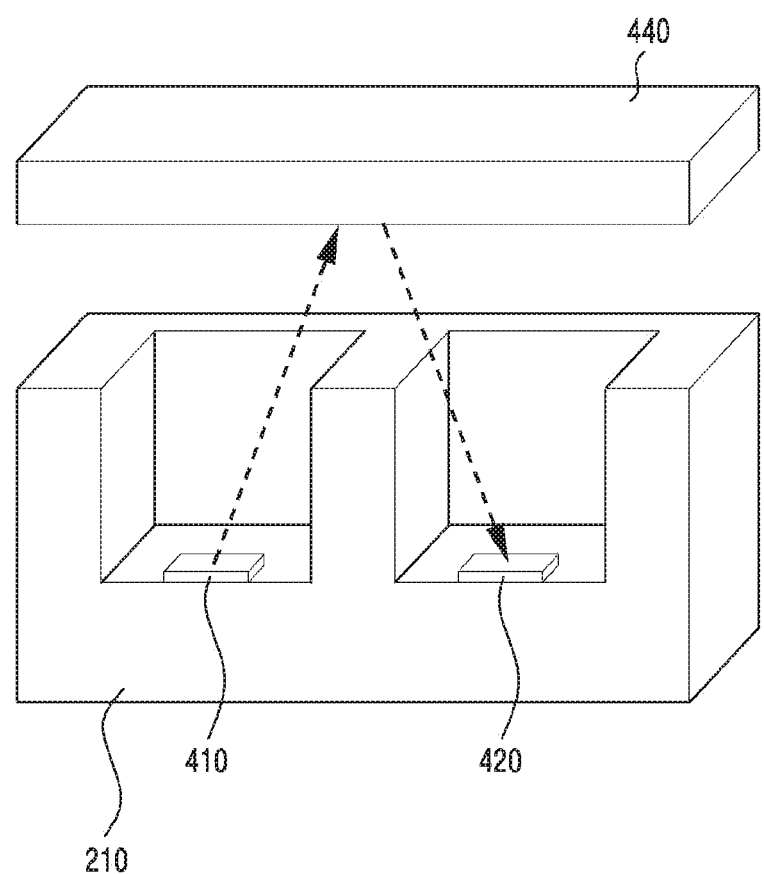
FIG. 4B illustrates the structure of the first sensor configured to measure a value indicating whether an external object is in proximity according to various embodiments of the disclosure.
Figure 4C:
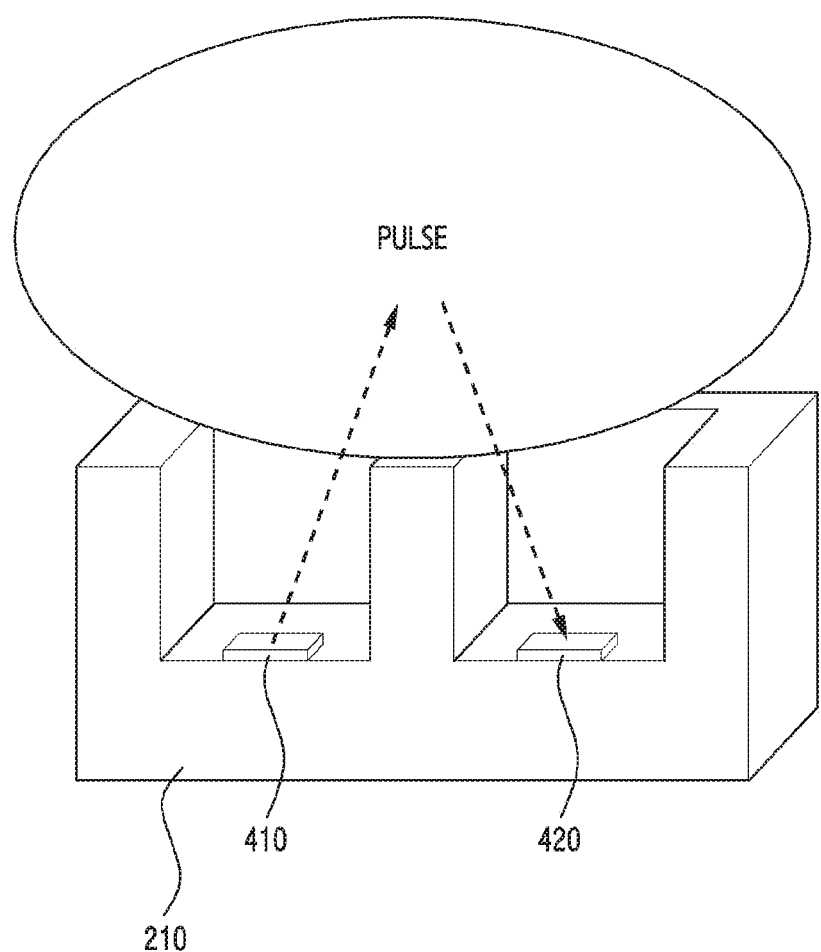
FIG. 4C illustrates the structure of the first sensor configured to acquire biometric information according to various embodiments of the disclosure.

FIGS. 4A to 4C illustrate the structure of a first sensor according to various embodiments of the disclosure.

According to an embodiment, a first sensor 210 or 310 may be an optical sensor disposed on one surface (for example, front surface) of the electronic device 200 or 300 to measure illuminance.

According to an embodiment, the first sensor 210 or 310 may include at least one light emitter 410 and at least one light receiver 420. For example, the light emitter 410 may be a light-emitting diode. In another example, the light emitter 410 may include at least one of Infrared Emitting Diodes (IRED), green LED, red LED, and blue LED.

According to an embodiment, the light emitter 410 and the light receiver 420 may be disposed to face the same direction. For example, the light emitter 410 and the light receiver 420 may be disposed to face a direction perpendicular to the front surface of the electronic device 200.

According to an embodiment, the light emitter 410 and the light receiver 420 may be disposed in parallel in one direction.

According to an embodiment, one or more partitions 430 may be disposed on both side surfaces of the light emitter 410 and the light receiver 420 or between the light emitter 410 and the light receiver 420.

According to an embodiment, the first sensor 210 or 310 may be configured to perform not only an illuminance-measuring function but also other functions required to more accurately measure illuminance. For example, the first sensor 210 or 310 may be configured to perform a function of determining whether an external object is in proximity or a function of measuring a user's biometric signal.

According to an embodiment, the first sensor 210 or 310 may operate in different operation modes. For example, the first sensor 210 or 310 may operate at least one of a first mode, a second mode, or a third mode. The first mode may be an ambient light mode for measuring illuminance, the second mode may be a proximity mode for determining whether an external object is in proximity, and the third mode may be a bio information acquisition mode for acquiring user's biometric information. Hereinafter, the operation of the first sensor for each mode will be described in detail with reference to FIGS. 4A, 4B, and 4C.

FIG. 4A illustrates the structure of the first sensor configured to operate in the first mode.

According to an embodiment, the first mode may be an ambient light mode for measuring illuminance.

According to an embodiment, when the first sensor 210 or 310 operates in the first mode, the light emitter 410 of the first sensor 210 or 310 may be deactivated and the light receiver 420 may be activated. The first sensor 210 or 310 may detect an ambient light through the activated light receiver 420 and output a value of current or voltage varying depending on the brightness of the detected ambient light, that is, illuminance to the processor 620.

FIG. 4B illustrates the structure of the first sensor configured to operate in the second mode.

According to an embodiment, the second mode may be a proximity mode for determining whether an external object 440 is in proximity.

According to an embodiment, a default operation mode of the first sensor 210 or 310 may be the first mode. The operation mode of the first sensor 210 or 310 may be changed under the control of the processor 620.

For example, the processor 620 of the electronic device may change the operation mode of the first sensor 210 or 310 from the first mode to the second mode based on the illuminance value output by the first sensor 210 or 310 operating in the first mode. For example, when the illuminance value output by the first sensor 210 or 310 operating in the first mode is equal to or smaller than a predetermined (for example, specified) value, the processor 620 of the electronic device may change the operation mode of the first sensor 210 or 310 from the first mode to the second mode.

According to an embodiment, when the first sensor 210 or 310 is configured to operate in the second mode, both the light emitter 410 and the light receiver 420 of the first sensor 210 or 310 may be activated. The first sensor 210 or 310 may shoot a light of a predetermined wavelength through the activated light emitter 410 and then measure an amount of the light of the predetermined wavelength through the activated light receiver 420, so as to determine whether the external object 440 is in proximity to the first sensor 210 or 310. The location of the external object 440 in proximity to the first sensor 210 or 310 may be the location of the external object 440 within a predetermined range from the first sensor 210 or 310.

FIG. 4C illustrates the structure of the first sensor configured to operate in the third mode.

Although not illustrated, the first sensor 210 or 310 may include at least one electrode adjacent to the light emitter 410 and the light receiver 420. At least one electrode adjacent to the light emitter 410 and the light receiver 420 may be at least one electrode 320.

According to an embodiment, the processor 620 of the electronic device may perform various functions using at least one electrode adjacent to the light emitter 410 and the light receiver 420. For example, the processor 620 of the electronic device may perform at least one of detection of a touch by a user's body, detection of proximity of a user's body, wearing of the electronic device on a user's body when the electronic device is a wearable device, release of wearing thereof, and measurement of user's biometric information through at least one electrode.

According to an embodiment, at least one electrode may be configured to generate a pulse according to a predetermined period, and the pulse generated by at least one electrode may be used to acquire user's biometric information (for example, ECG or bioimpedance).

According to an embodiment, the first sensor 210 or 310 may measure biometric information related to the user based on at least one light output by the light emitter 410 and the light input by the light receiver 420. For example, when at least one light output by the light emitter 410 is input reflected from a user's skin tissue and input into the light receiver 420, the first sensor 210 or 310 may measure biometric information related to the user (heart rate information, oxygen saturation (SpO2), stress information, blood pressure information, and blood sugar information).

Figure 5A:
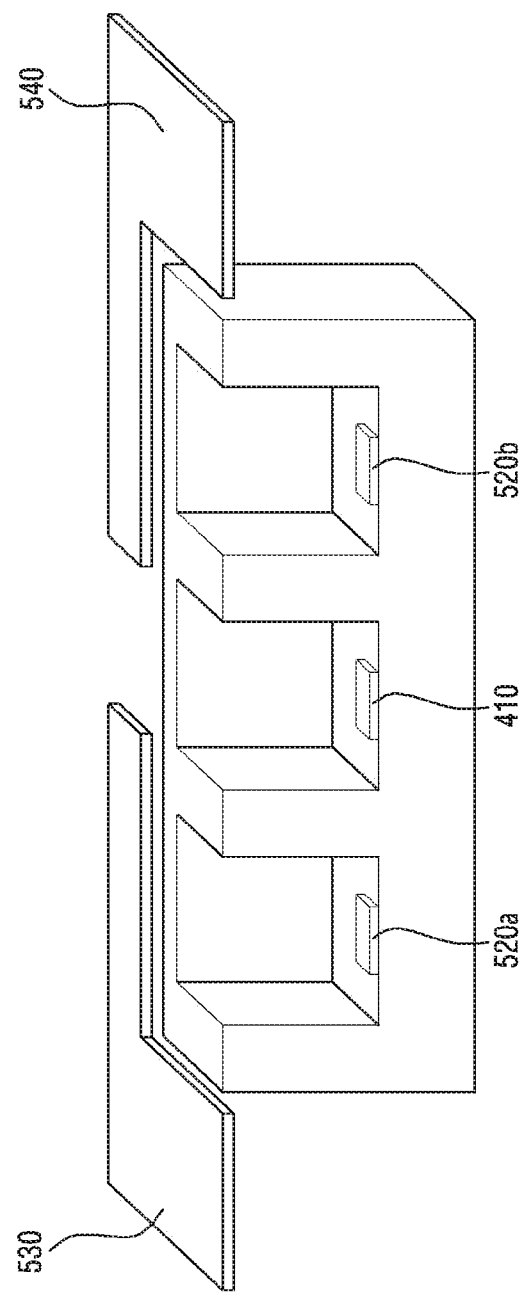

FIGS. 5A and 5B illustrate the structure of the first sensor configured to measure illuminance according to various embodiments of the disclosure.

According to an embodiment, the first sensor 210 or 310 may be an optical sensor 612 which is a sensor configured to measure illuminance.

According to an embodiment, the first sensor 210 or 310 may include at least two light receivers. For example, the first sensor 210 or 310 may include a first light receiver 520a and a second light receiver 520b. The first light receiver 520a and the second light receiver 520b may be designated to different wavelength ranges. That is, the first light receiver 520a and the second light receiver 520b may be configured to receive lights in different wavelength ranges.

According to an embodiment, the light emitter 410 of the first sensor 210 or 310 may include at least two light emitters. At least two light emitters may be designated to different wavelength ranges. For example, at least two light emitters may include a first light emitter and a second light emitter, and the first light emitter may be designated to a first wavelength range and the second light emitter may be designated to a second wavelength range.

According to an embodiment, the first sensor 210 or 310 may include at least one electrode adjacent to the light emitter 410 and the light receivers 520a and 520b. At least one electrode may include a first electrode 530 and additionally a second electrode 540. At least one electrode may be configured to generate a pulse according to a predetermined period, and the pulse generated by at least one electrode may be used to acquire user's biometric information.

According to an embodiment, the first sensor 210 or 310 may acquire various pieces of user's biometric information through at least one light receiver or at least one light emitter. For example, the first sensor 210 or 310 may radiate a light of a specific wavelength generated by the light emitter 520 of the first sensor 210 or 310 to a user's body and then acquire information of a blood flow rate of the user based on a change in the amount of light reflected from the user's body and received by the light receiver 520a or 520b.

According to an embodiment, the first sensor 210 or 310 may combine lights of different wavelengths in order to acquire various pieces of user's biometric information. For example, the first sensor 210 or 310 may combine the light of the first wavelength range generated by the first light emitter and the light of the second wavelength range generated by the second light emitter in order to acquire user's blood sugar information.

Figure 6:
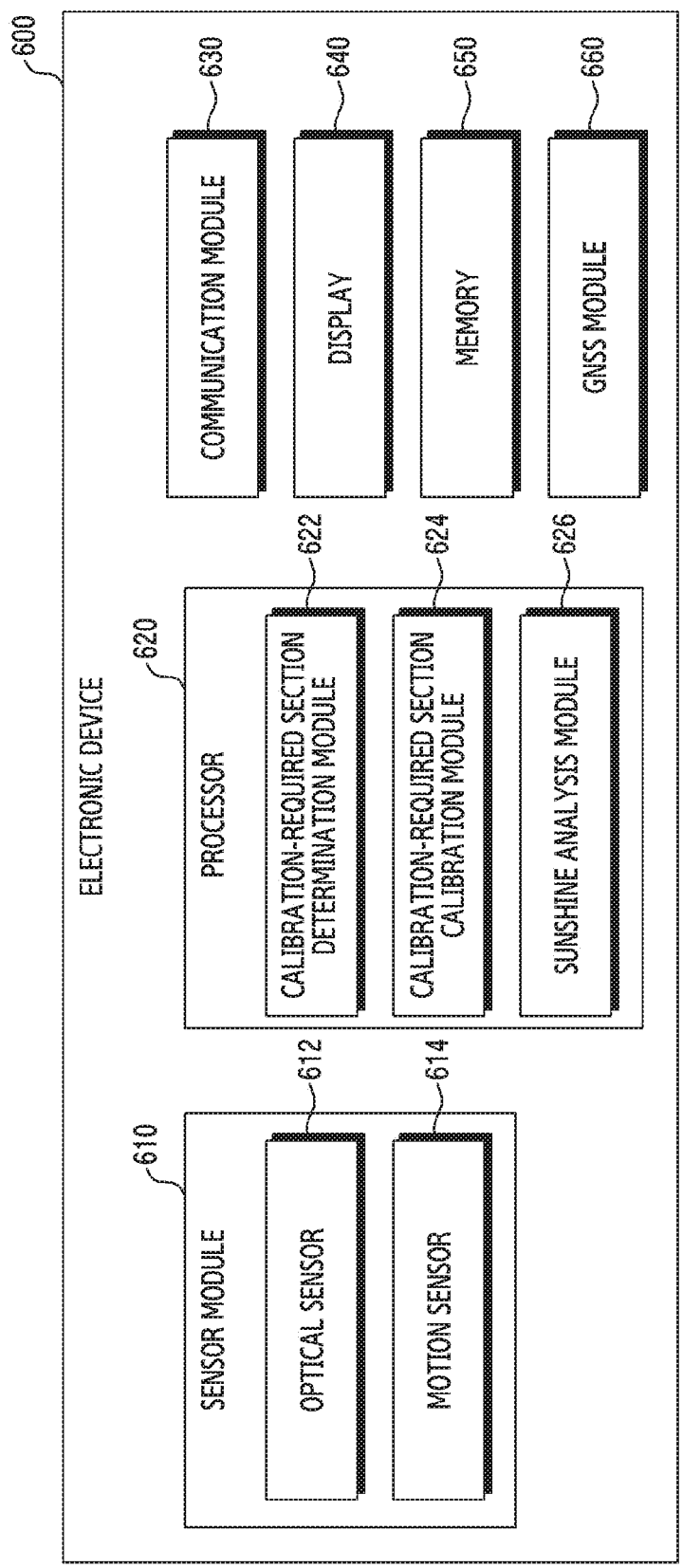
FIG. 6 is a block diagram of an electronic device according to various embodiments.

FIG. 6 is a block diagram of an electronic device according to various embodiments of the disclosure.

According to an embodiment, an electronic device 600 may be the electronic device 200 or the electronic device 300.

Referring to FIG. 6, the electronic device 600 may include a sensor module 610, a processor 620, a communication module 630, a display 640, a memory 650, and a GNSS module 660.

According to an embodiment, the sensor module 610 may include one or more sensors for sensing ambient environment information of the electronic device. According to an embodiment, the sensor module 610 may be the sensor module 176 of FIG. 1. For example, the sensor module 610 may include an optical sensor 612 and a motion sensor 614.

According to an embodiment, the optical sensor 612 may be a sensor for measuring illuminance. The optical sensor 612 may include at least one light emitter and at least one light receiver, detect an ambient light through at least one light receiver, and determine whether an external object is in proximity thereto through at least one light emitter and at least one light receiver or measure user's biometric information.

According to an embodiment, the optical sensor 612 may be configured to operate in different operation modes. For example, the optical sensor may be configured to operate in a first mode for measuring illuminance, a second mode for determining whether an external object is in proximity, and a third mode for acquiring user's biometric information (for example, a heart rate).

According to an embodiment, the motion sensor 614 may be a sensor for acquiring information on user's motion. For example, the motion sensor 614 may be at least one of an acceleration sensor, a gyro sensor, a geomagnetic sensor, and an air pressure sensor.

According to an embodiment, information on the user's motion acquired using the motion sensor 614 may be used to determine a new illuminance value in a section in which it is determined that the illuminance value is not correct. For example, when it is determined that illuminance value in a first section is not correct and there is no motion of the electronic device in the first section, the processor 620 of the electronic device may determine a new illuminance value of the first section based on an illuminance value in another section (second section) close to the first section. The section close to the first section may indicate a section within a predetermined time from the first section. For example, when it is determined that illuminance value of the first section is not correct and there is no motion of the electronic device in the first section, the processor 620 of the electronic device may determine a new illuminance value of the first section based on an illuminance value of the second section which is a section right before the first section.

According to an embodiment, the communication module 630 may support wired or wireless communication between the electronic device 600 and an external electronic device (the electronic device 104 or the server 108). According to an embodiment, the communication module 630 may be the communication module 190 of FIG. 1.

According to an embodiment, the processor 620 of the electronic device may exchange data with an external device through the communication module 630. For example, the processor 620 of the electronic device may access an external device (for example, a weather center website) through the communication module 630 in order to check weather information in a section in which it is determined that an illuminance value is not correct.

According to an embodiment, the processor 620 of the electronic device may acquire information on user's motion or location information through at least one module included in the communication module 630.

According to an embodiment, the display 640 may display at least one piece of information on the screen. According to an embodiment, the display 640 may be the display 220. The display 640 may display user guide information determined based on information acquired through the sensor module 610 or information acquired through the sensor module 610. For example, when a time during which the user actually stayed outdoors last week is shorter than an optimum outdoor stay time of the user, the processor 620 of the electronic device may control the display 640 to display information on a required time during which the user stays outdoors (or an amount of the sun to which the user is required to be additionally exposed).

According to an embodiment, the memory 650 may store at least one piece of information. For example, the memory 650 may store user's biometric information (for example, a user's skin type) and information acquired by one or more sensors included in the sensor module 610.

According to an embodiment, the GNSS module 660 may be a module for determining the current location of the electronic device 600 using radio waves transmitted by a GPS satellite that orbits.

According to an embodiment, the processor 620 may control the operation of one or more modules included in the electronic device 600.

According to an embodiment, the processor 620 may include a calibration-required section determination module 622, a calibration-required section calibration module 624, and a sunshine analysis module 626.

According to an embodiment, the calibration-required section determination module 622 may determine a section (hereinafter, referred to as a "calibration-required section") in which it is determined an illuminance value is not correct in a specific time section. For example, when the illuminance value of the first section is equal to or smaller than a preset threshold value range and an external object is in proximity in the first section (for example, the distance between the electronic device and the external object is within a first predetermined range), the calibration-required section determination module 622 may determine that the illuminance value of the first section is not correct and determine the first section as a calibration-required section. In another example, when the illuminance value of the first section is equal to or smaller than a preset threshold value range but an external object is not in proximity in the first section (for example, the distance between the electronic device and the external electronic device is within a second predetermined range), the calibration-required section determination module 622 may not determine the first section as a calibration-required section. In another example, when it is detected that the electronic device is charged in at least some of the second section, the calibration-required section determination module 622 may determine the second section as a calibration-required section.

According to an embodiment, the calibration-required section calibration module 624 may determine an illuminance value in the calibration-required section. For example, when the illuminance value of the first section is equal to or smaller than a preset threshold value range and an external object is in proximity in the first section (for example, the distance between the electronic device and the external object is within a first predetermined range), the calibration-required section calibration module 624 may newly determine an illuminance value of the first section using at least one of the GNSS module 660, the motion sensor 614, APP use information, and Wi-Fi Positioning System (WPS) information. In another example, when it is detected that the electronic device is charged in at least some of the second section, the calibration-required section calibration module 624 may newly determine an illuminance value in the second section based on a manual control input of the user.

According to an embodiment, the sunshine analysis module 626 may acquire information on an amount of sunshine or an ambient light in a specific time range by analyzing a plurality of illuminance values included in the specific time range (for example, year, month, week, and day). According to an embodiment, information on the amount of sunshine or ambient light in the specific time range may be statistical information on a plurality of illuminance values included in the specific time range. For example, the sunshine analysis module 626 may determine a time in which the user actually stays outdoors within the specific time range based on the plurality of illuminance values included in the specific time range. Further, the sunshine analysis module 626 may compare an optimum outdoor stay time that is determined based on a user's skin type and a user location with the time in which the user actually stays outdoors and provide (for example, display) a notification indicating that the user is exposed to the sun within the specific time range at an optimum level or a notification indicating that the user it not exposed to the sun at an optimum level.

Figure 7:
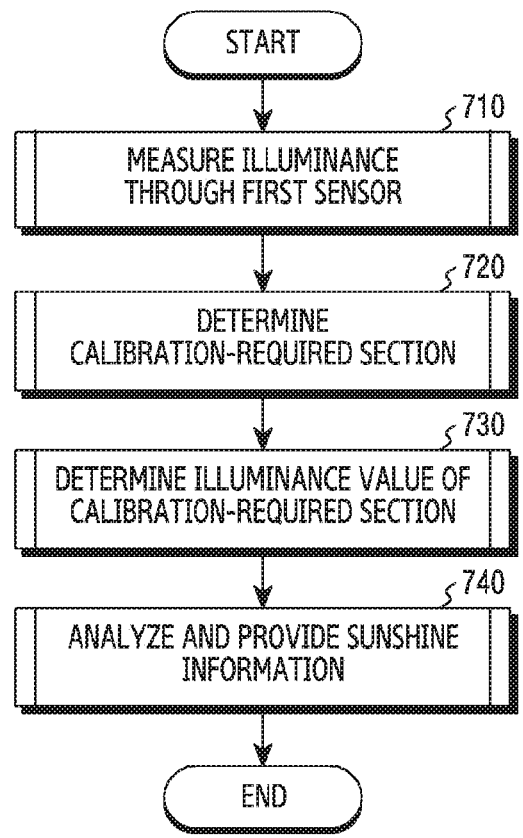
FIG. 7 is a flowchart illustrating the operation in which the electronic device provides sunshine information according to various embodiments of the disclosure.

FIG. 7 is a flowchart illustrating the operation in which an electronic device provides sunshine information according to various embodiments of the disclosure of the disclosure.

In operation 710, the processor 620 of the electronic device may measure illuminance through the first sensor 210 or 310.

According to an embodiment, operation 710 may be performed while an illuminance measurement function is activated. The illuminance measurement function may be activated or deactivated according to user input, and may be automatically activated or deactivated according to time information even though there is no user input. For example, the processor may activate the illuminance measurement function according to reception of user input for activating execution of an application related to the illuminance measurement function (or having the illuminance measurement function). In another example, even if there is no user input, the processor may activate the illuminance measurement function in a time section (for example, a time section from sunrise to sunset) during which is it generally determined that the sun rises. The processor may deactivate the illuminance measurement function in a time section (for example, a time section from sunset to sunrise) during which is it generally determined that the sun sets.

According to an embodiment, operation 710 may be periodically performed while the illuminance measurement function is activated. Operation 710 may be repeatedly performed periodically according to a preset time while the illuminance measurement function is activated. For example, the first sensor 210 or 310 may measure illuminance at a first time point and then measure illuminance at a second time point after a preset interval from the first time point. The processor 620 of the electronic device may acquire a plurality of illuminance measurement values corresponding to different time points through the first sensor 210 or 310 configured to periodically measure illuminance while the illuminance measurement function is activated and group the plurality of acquired illuminance measurement values into one or more sections. For example, the processor 620 of the electronic device may determine a first section based on n consecutive illuminance measurement values.

According to an embodiment, the period on which operation 710 is performed may be manually changed according to an explicit configuration of the user. When there is an indirect configuration of the user even if there is no explicit configuration of the user (for example, there is a configuration of the user related to a battery of the electronic device), the processor 620 of the electronic device may change the period on which operation 710 is performed. Further, the processor 620 of the electronic device may automatically change the period on which operation 710 is performed even though there is no configuration of the user. For example, when the user configures the mode of the electronic device 600 to be a power mode, the processor 620 of the electronic device may increase the period on which operation 710 is performed by a preset rate.

According to an embodiment, when the electronic device is a wearable device (for example, the wearable device 300 of FIG. 3), the processor 620 of the electronic device may perform 710 only when wearing of the electronic device on a part of the user's body is detected.

In operation 720, the processor 620 of the electronic device may determine a calibration-required section.

According to an embodiment, the plurality of illuminance values measured in operation 710 may be grouped to one or more sections according to time points at which the plurality of illuminance values are measured. The section may be a time section. For example, the number (for example, 10) of consecutive illuminance measurement values may be grouped to one section.

According to an embodiment, the processor 620 of the electronic device may determine an illuminance value in a specific section based on the plurality of illuminance values included in the specific section. The illuminance value in the specific section may be an illuminance value that represents the specific section.

According to an embodiment, the processor 620 of the electronic device may determine a calibration-required section among one or more sections. The calibration-required section may be a section of which the identified illuminance value is not correct. For example, when the electronic device is a wearable device and the electronic device is covered by a sleeve in at least some of the first section, the processor 620 of the electronic device may determine a first section as a calibration-required section.

According to an embodiment, the processor 620 of the electronic device may simultaneously measure illuminance and determine the calibration-required section, or may determine the calibration-required section after a predetermined time from the completion of the illuminance measurement. For example, when the electronic device is covered by the sleeve in at least some of the first section and the first section corresponds to pm 13:00 to pm 13:05, the processor 620 of the electronic device may determine that the first section is the calibration-required section during pm 13:00 to pm 13:05. Further, the processor 620 of the electronic device may determine that the first section is the calibration-required section during at pm 24:00.

In operation 730, the processor 620 of the electronic device may determine an illuminance value in the calibration-required section.

According to an embodiment, the processor 620 of the electronic device may determine the illuminance value in the calibration-required section using at least one of a measurement value of a second sensor different from the first sensor 210 or 310, information on an application use history by the user, WPS information, and user control information.

According to an embodiment, at least one of the measurement value of the second sensor, the information on the application use history, the WPS information, and the user control information may or may not correspond to the calibration-required section. For example, the information on the application use history may correspond to a time point included in the calibration-required section. In another example, the measurement value of the motion sensor 614 included in the second sensor may correspond to a time point included in a previous section of the calibration-required section.

According to an embodiment, the processor 620 of the electronic device may newly determine the illuminance value in the calibration-required section after initializing the illuminance value in the calibration-required section or may calibrate the illuminance value in the calibration-required section without initializing the illuminance value in the calibration-required section.

In operation 740, the processor 620 may analyze sunshine information and provide (for example, display) the analyzed sunshine information.

According to an embodiment, the processor 620 of the electronic device may group one or more sections included in one time unit. One time unit may be one of year, month, week, and day.

For example, the processor 620 of the electronic device may determine sections included in a predetermined date (for example, yesterday) as one group.

According to an embodiment, the processor 620 of the electronic device may group one or more illuminance values included in one time unit.

According to an embodiment, the processor 620 of the electronic device may analyze sunshine information on a time section designated based on illuminance values in the grouped sections. A specific section may be one time unit, for example, one of year, month, week, and day. For example, the processor 620 of the electronic device may determine a total amount of the sun to which the user is exposed during the designated time section (for example, yesterday) by accumulating illuminance values in sections included in the designated time section (for example, yesterday).

According to an embodiment, the processor 620 of the electronic device may provide analyzed sunshine information. For example, the processor 620 of the electronic device may control the display 640 to display information on the total amount of the sun to which the user is exposed during the designated time section (for example, yesterday) on the screen.

According to an embodiment, the processor 620 of the electronic device may provide not only information on the previously measured illuminance value but also user guide information on the amount of the sun to which the user should be exposed in the future. For example, the processor 620 of the electronic device may determine information on the amount of the sun to which the user is required to be exposed during a predetermined time section (for example, one month) based on the user location and information on a user's skin tone. The processor 620 of the electronic device may provide the user with information on the amount of the sun to which the user is required to be exposed in the remaining time sections (for example, from October 10 to October 31 when the operation is performed on October 10) based on information on a previously measured illuminance value (for example, information on an illuminance value measured from October 1 to October 9 when the operation is performed on October 10) included in a predetermined time section (for example, one month (October)).

According to an embodiment, when providing sunshine information to the user, the processor 620 of the electronic device may use various forms of user interfaces. For example, the processor 620 of the electronic device may control the display 640 to display sunshine information on the screen. In another example, the processor 620 of the electronic device may control an audio module to provide sunshine information to the user in the form of a sound. In another example, the processor 620 of the electronic device may transmit sunshine information to another electronic device through the communication module 630.

Figure 8:
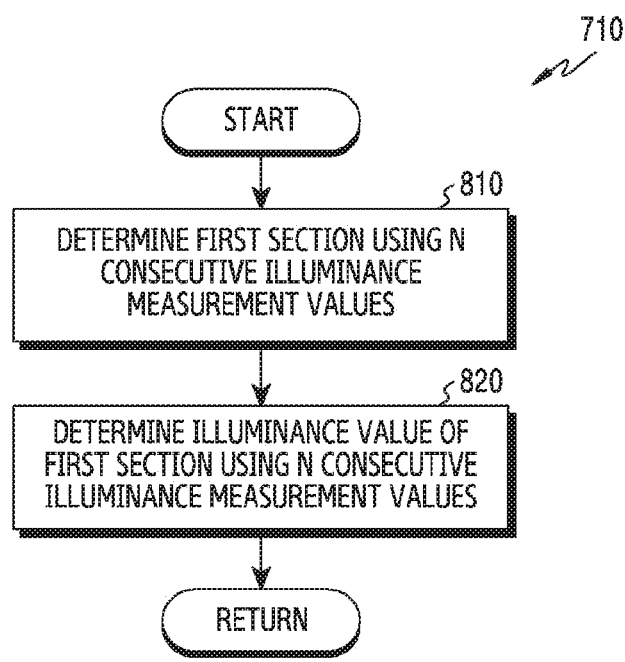
FIG. 8 is a flowchart illustrating in detail the operation in which the electronic device measures illuminance according to various embodiments of the disclosure.

FIG. 8 is a flowchart illustrating in detail the operation in which the electronic device measures illuminance according to various embodiments of the disclosure.

According to an embodiment, the operation in which the electronic device measures illuminance may be operation 710 of FIG. 7.

As described with reference to FIG. 7, the processor 620 of the electronic device may acquire a plurality of illuminance measurement values corresponding to different time points through the first sensor 210 or 310 configured to periodically measure illuminance while the illuminance measurement function is activated.

In operation 810, the processor 620 of the electronic device may determine a first section based on n consecutive illuminance measurement values. For example, a time section including all time points at which the n consecutive illuminance measurement values are measured may be determined as the first time section. At this time, another illuminance measurement value that is not included in the n consecutive illuminance measurement values may not be included in the first section.

According to an embodiment, n may be a value designated by the processor of the electronic device. The processor 620 of the electronic device may change n according to a period on which operation 710 is performed. For example, when the period on which operation 710 is performed increases by a preset rate, the processor 620 of the electronic device may increase n by the preset rate.

According to an embodiment, even if the period on which operation 710 is performed is changed, the processor 620 of the electronic device may not change n.

In operation 820, the processor 620 of the electronic device may determine the illuminance in the first section based on the n consecutive illuminance measurement values.

According to an embodiment, the illuminance value of the first section may be an illuminance value that represents the first section.

According to an embodiment, the illuminance value that represents the first section may be statistical representative value of the n consecutive illuminance measurement values. For example, the processor 620 of the electronic device may determine at least one of the average, the median, or the mode of the n consecutive illuminance measurement values as the illuminance value that represents the first section.

According to an embodiment, the illuminance value that represents the first section may be determined as a statistical representative value of k illuminance values selected from the n consecutive illuminance measurement values included in the first section (n>=k). For example, when the n illuminance measurement values are arranged in a descending order, the illuminance value that represents the first section may be determined as the average of the k illuminance measurement values extracted in a descending order from the maximum value.

According to an embodiment, the illuminance value that represents the first section may be a value derived from the statistical representative value of the n consecutive illuminance measurement values included in the first section.

Figure 9:
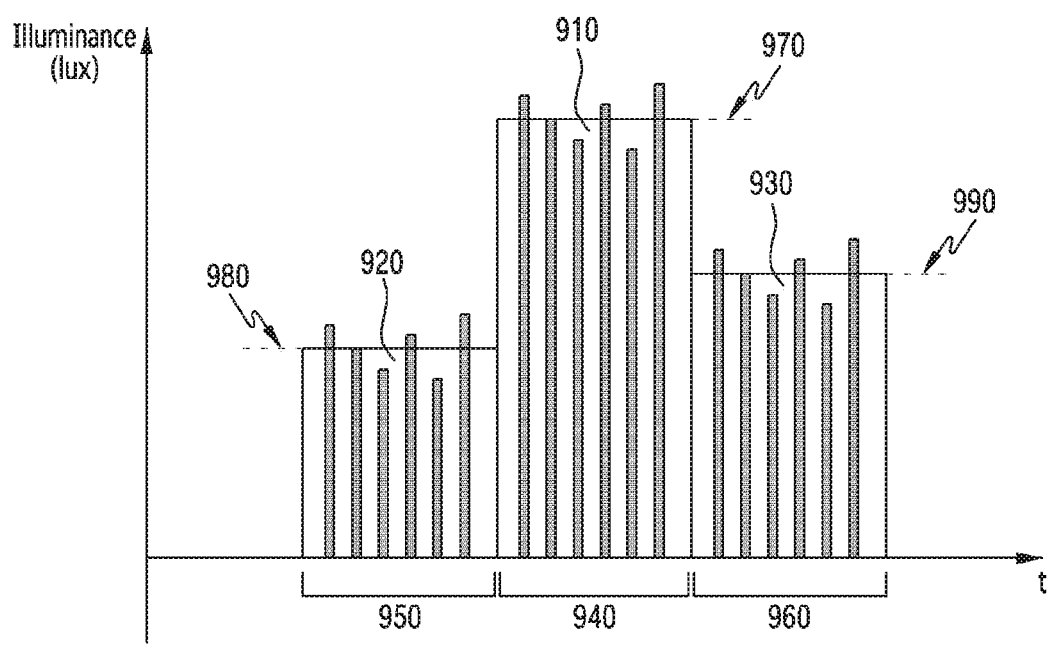
FIG. 9 illustrates the relationship between a plurality of illuminance measurement values and one or more sections according to various embodiments of the disclosure.

FIG. 9 illustrates the relationship between a plurality of illuminance measurement values and one or more sections according to various embodiments of the disclosure.

According to an embodiment, a graph having an x axis in units of time (unit t) and a y axis in units of illuminance (unit lux) is illustrated. A plurality of illuminance values measured through the first sensor 210 or 310 may correspond to respective one time points according to time points at which the plurality of illuminance values are measured.

According to an embodiment, the plurality of illuminance values measured through the first sensor 210 or 310 may be grouped to one or more sections according to time points at which the plurality of illuminance values are measured. For example, n illuminance values 940 among the plurality of illuminance values measured through the first sensor 210 or 310 may be grouped to a first section 910. In another example, n illuminance values 950 and n illuminance values 960 may be grouped to a second section 920 and a third section 930, respectively.

According to an embodiment, an illuminance value of a predetermined section may be determined based on n illuminance values included in the predetermined section. For example, an illuminance value 970 of the first section may be determined based on the n illuminance values 940 included in the first section 910. For example, when the n illuminance values 940 included in the first section 910 are arranged in a descending order, the processor 620 of the electronic device may determine the average of k illuminance measurement values extracted in a descending order from the maximum value as the illuminance value 970 of the first section.

Figure 10:
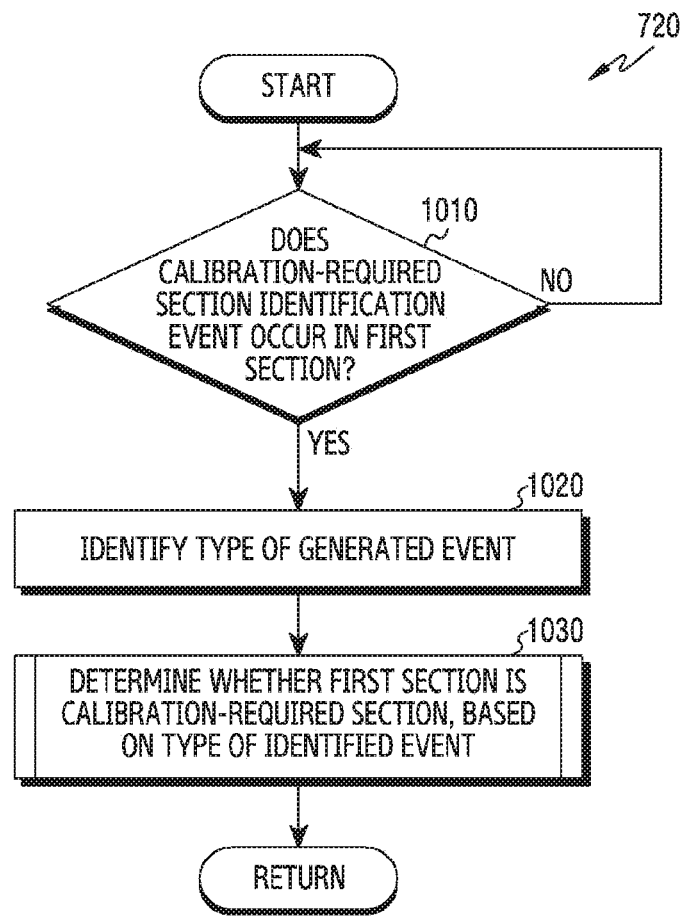
FIG. 10 is a flowchart illustrating in detail the operation in which the electronic device determines a calibration-required section according to various embodiments of the disclosure.

FIG. 10 is a flowchart illustrating in detail the operation in which the electronic device determines a calibration-required section according to various embodiments of the disclosure.

According to an embodiment, the operation in which the electronic device determines the calibration-required section may be operation 720 of FIG. 7.

In operation 1010, the processor 620 of the electronic device may identify whether a calibration-required section identification event occurs in the first section.

According to an embodiment, the calibration-required section identification event may be an event for identifying whether a section including a time point at which the calibration-required section identification event occurs is the calibration-required section.

According to an embodiment, the calibration-required section may be a section in which it is determined that the identified illuminance value thereof is not correct. For example, when the electronic device 600 is covered by an external object (for example, sleeve) in at least some of the first section, the electronic device 600 may determine that the identified illuminance value of the first section is not correct and determine the first section as the calibration-required section.

According to an embodiment, the calibration-required section identification event may include a plurality of different events. For example, the calibration-required section identification event may include a first event for detecting that the illuminance value of the first section is equal to or smaller than a preset threshold value (hereinafter, referred to as a "first threshold value"), a second event for detecting charging of the electronic device 600 in at least some of the first section and detecting no motion of the electronic device, and a third event for detecting that the electronic device 600 is not worn on the user's body in at least some of the first section when the electronic device 600 is a wearable device.

When the calibration-required section identification event does not occur in operation 1010, the processor 620 of the electronic device may repeatedly perform operation 1010.

When the calibration-required section identification event occurs in operation 1010, the processor 620 of the electronic device may identify the type of the occurring event in operation 1020. For example, the processor 620 of the electronic device may identify whether the occurring event is the first event, the second event, or the third event in operation 1020.

In operation 1030, the processor 620 of the electronic device may determine whether the first section is the calibration-required section based on the type of the identified event. For example, when the identified event is the second event for detecting charging of the electronic device in at least some of the first section and detecting no motion of the electronic device, the processor 620 of the electronic device may determine the first section as the calibration-required section.

In another example, when the electronic device is a wearable device and the identified event is the third event for detecting that the electronic device is not worn on the user's body in at least some of the first section, the processor 620 of the electronic device may determine the first section as the calibration-required section. When the identified event is the first event, the processor 620 of the electronic device may need to additionally perform one or more operations in order to determine the first section as the calibration-required section.

When the identified event is the first event, one or more operations to be additionally performed are described with reference to FIG. 11A.

Figure 11A:
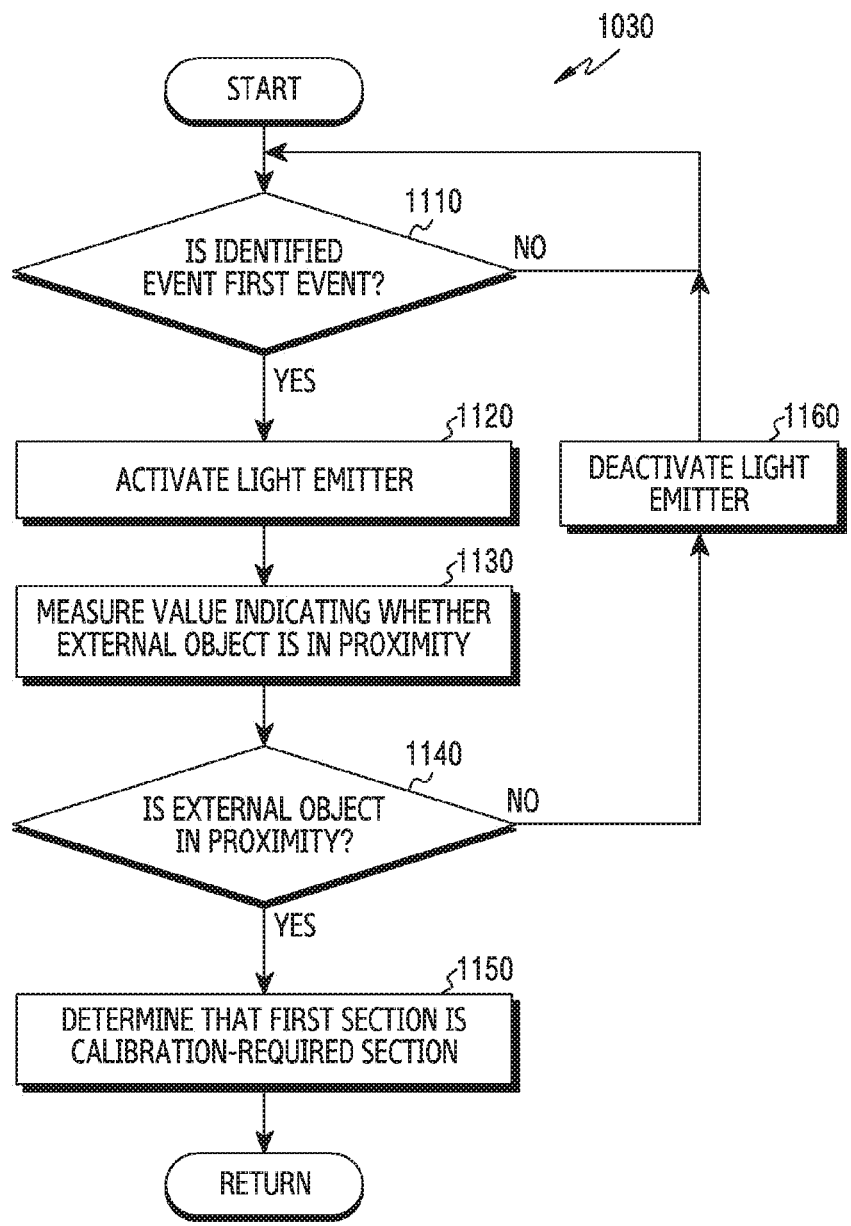
FIG. 11A is a flowchart illustrating in detail the operation in which the electronic device determines whether a first section is a calibration-required section based on the type of an identified event according to various embodiments of the disclosure.

FIG. 11A is a flowchart illustrating in detail the operation in which the electronic device determines whether the first section is the calibration-required section based on the type of the identified event according to various embodiments of the disclosure.

According to an embodiment, the operation in which the electronic device determines whether the first section is the calibration-required section based on the type of the identified event may be operation 1030 of FIG. 10.

In operation 1110, the processor 620 of the electronic device may determine whether the identified event is the first event.

According to an embodiment, the first event may be an event for determining that the illuminance value of the first section is equal to or smaller than a first threshold value.

According to an embodiment, the first threshold value may be a reference value for distinguishing the case in which the electronic device does not directly receive the sunlight and the case in which the electronic device directly receives the sunlight.

The case in which the electronic device does not directly receive the sunlight may indicate the case in which the sunlight is not incident to at least some of the light receiver 420 of the sensor (for example, the first sensor 210 or 310) for measuring illuminance. For example, as the external object (for example, sleeve) is located between the light receiver 420 and the sun within a predetermined distance from the light receiver 420, the case may be the case in which the sunlight is not incident to at least some of the light receiver 420.

The case in which the electronic device directly receives the sunlight may be the case in which the sunlight is incident to the light receiver 420 of the sensor (for example, the first sensor 210 or 310) for measuring illuminance.

According to an embodiment, the first threshold value may be the average of a value statistically determined using illuminance values measured when the electronic device directly receives the sunlight and a value statistically determined using illuminance values measured when the electronic device does not directly receive the sunlight. When the illuminance value of the first section is equal to or smaller than a first threshold range, the processor 620 of the electronic device may determine that the electronic device does not directly receive the sunlight in the first section.

In operation 1120, the processor 620 of the electronic device may activate the light emitter 410.

According to an embodiment, the processor 620 of the electronic device may activate the light emitter 410 to determine whether the external object is in proximity.

According to an embodiment, the processor 620 of the electronic device may activate the light emitter 410 and output (for example, shoot or emit) a light having a predetermined wavelength and a constant intensity through the activated light emitter 410.

In operation 1130, the processor 620 of the electronic device may measure a value indicating whether the external object 440 is in proximity. According to an embodiment, the value indicating whether the external object 440 is in proximity may be a distance between the first sensor 210 or 310 and the external object 440. According to another embodiment, the value indicating whether the external object 440 is in proximity may be an amount of light having a predetermined wavelength, detected by the light receiver 420 after being emitted. According to another embodiment, the value indicating whether the external object 440 is in proximity may be a ratio between an amount of light having a predetermined wavelength emitted in operation 1120 and an amount of light having a predetermined wavelength detected by the light receiver 420 after being emitted.

In operation 1140, the processor 620 of the electronic device may determine whether the external object 440 is in proximity. According to an embodiment, the processor 620 of the electronic device may determine whether the external object 440 is in proximity based on the value measured in operation 1130. For example, the processor 620 of the electronic device may determine whether the value indicating whether the external object 440 is in proximity is larger than or equal to a second threshold value range. According to an embodiment, the second threshold value may be a reference value for determining that the first sensor of the electronic device is in proximity to the external object 440.

When the electronic device is not in proximity to the external object (for example, when the distance between the electronic device and the external object belongs to a second predetermined range (the distance is larger than or equal to the second threshold value)) in operation 1140, the processor 620 of the electronic device may deactivate the activated light emitter 410 in operation 1160 and perform operation 1110 again. When it is determined that the value indicating whether the external object is in proximity is larger than or equal to the second threshold value range, the processor 620 of the electronic device may determine that the illuminance value of the first section equal to or smaller than the first threshold value range is not due to covering of the external object 440.

Although not illustrated, the processor 620 of the electronic device may use the previously identified illuminance value of the first section without newly determining the illuminance value of the first section in operation 1160.

When the electronic device is in proximity to the external object (for example, when the distance between the electronic device and the external object belongs to a first predetermined range (the distance is smaller than the second threshold value)) in operation 1140, the processor 620 of the electronic device may determine the first section as the calibration-required section in operation 1150. When the distance between the electronic device and the external object is smaller than the second threshold value, the processor 620 of the electronic device may determine that the illuminance value of the first section equal to or smaller than the first threshold value range is due to covering of the external object 440 and determine the first section as the calibration-required section.

Figure 11B:
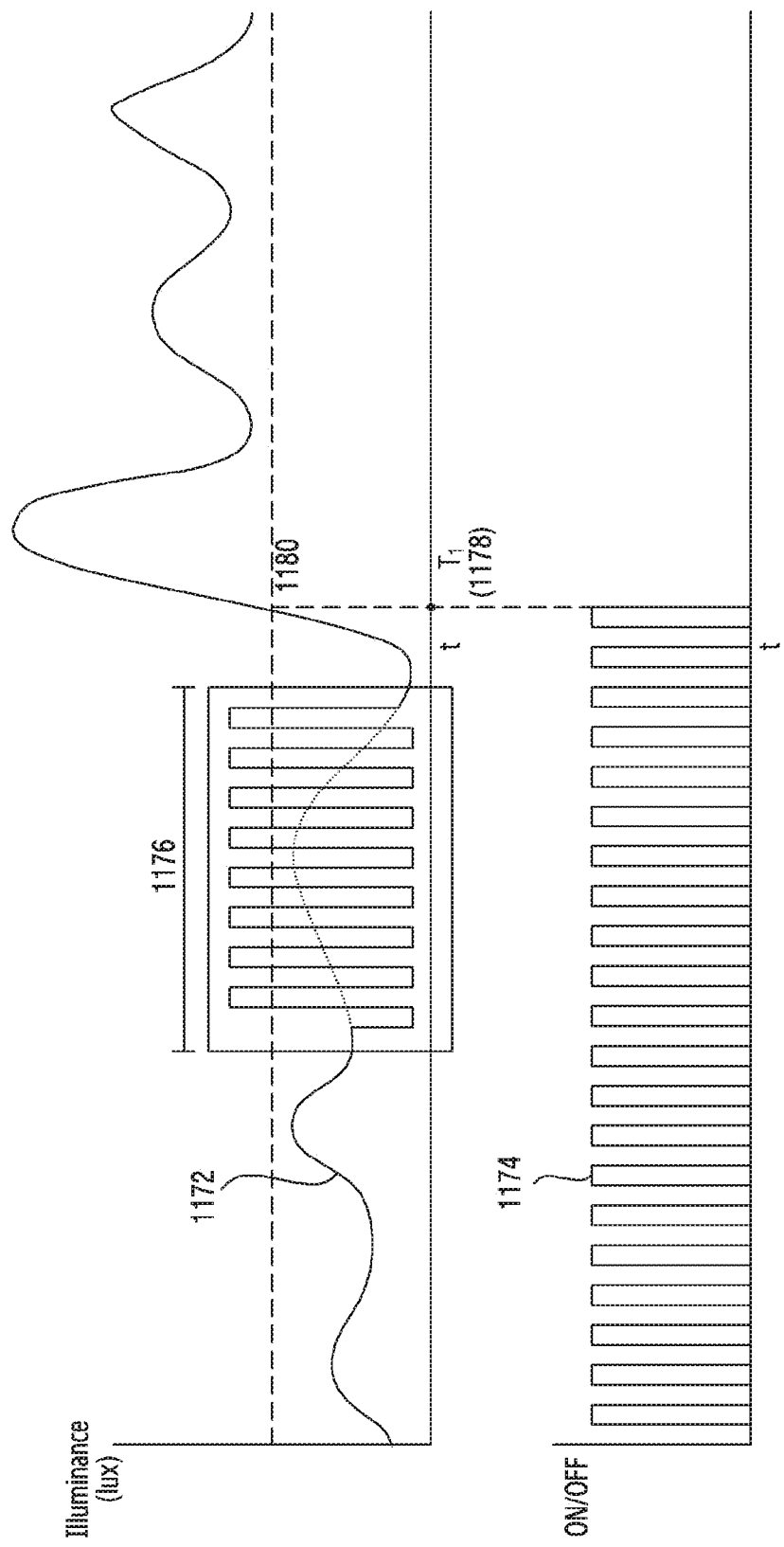
FIG. 11B illustrates an example in which the electronic device determines whether the first section is the calibration-required section based on the type of the identified event according to various embodiments of the disclosure.

FIG. 11B illustrates an example in which the first sensor determines whether the first section is the calibration-required section in response to occurrence of the first event according to various embodiments of the disclosure.

Referring to FIG. 11B, a first graph 1172 and a second graph 1174 are illustrated.

According to an embodiment, the first graph 1172 may be a graph showing an illuminance value detected by the light receiver 420 on the y axis and a time on the x axis.

According to an embodiment, the second graph 1174 may be a graph showing ON/OFF (or activation/deactivation) of the light emitter 410 within a predetermined time range on the y axis and a time on the x axis. Referring to the second graph 1174, the light emitter 410 may be periodically or aperiodically turned on or off within a first predetermined time range (t<T1) and may periodically or aperiodically emit a light having a constant intensity. Referring to the second graph 1174, the light emitter 410 may maintain the off state within a second predetermined time range (t>T2).

According to an embodiment, the processor 620 of the electronic device may identify whether the illuminance value detected by the light receiver 420 is larger than or equal to a first threshold value 1180. For example, the processor 620 of the electronic device may identify that the detected illuminance value is smaller than the first threshold value 1180 before T1 1178 and identify that the detected illuminance value is larger than or equal to the first threshold value 1180 after T1 1178.

According to an embodiment, when the detected illuminance value is smaller than the first threshold value as indicated by reference numeral 1180 (t<T1), the processor 620 of the electronic device may activate the light emitter 410 and periodically or aperiodically output a light having a constant intensity. According to another embodiment, when the detected illuminance value is larger than or equal to the first threshold value as indicated by reference numeral 1180 (t>T1), the processor 620 of the electronic device may deactivate the light emitter 410 and reduce power consumption.

According to an embodiment, after outputting the light having the constant intensity, the processor 620 of the electronic device may determine whether the external object 440 is in proximity based on the amount of the light detected by the light receiver 420. For example, when the amount of the light detected by the light receiver 420 periodically changes in a first section 1176 and a change period is the same as an output period of the light emitter 430, the processor 620 of the electronic device may determine that the electronic device is covered by the external device 440 in the first section 1176 and determine the first section 1176 as the calibration-required section.

Figure 12:
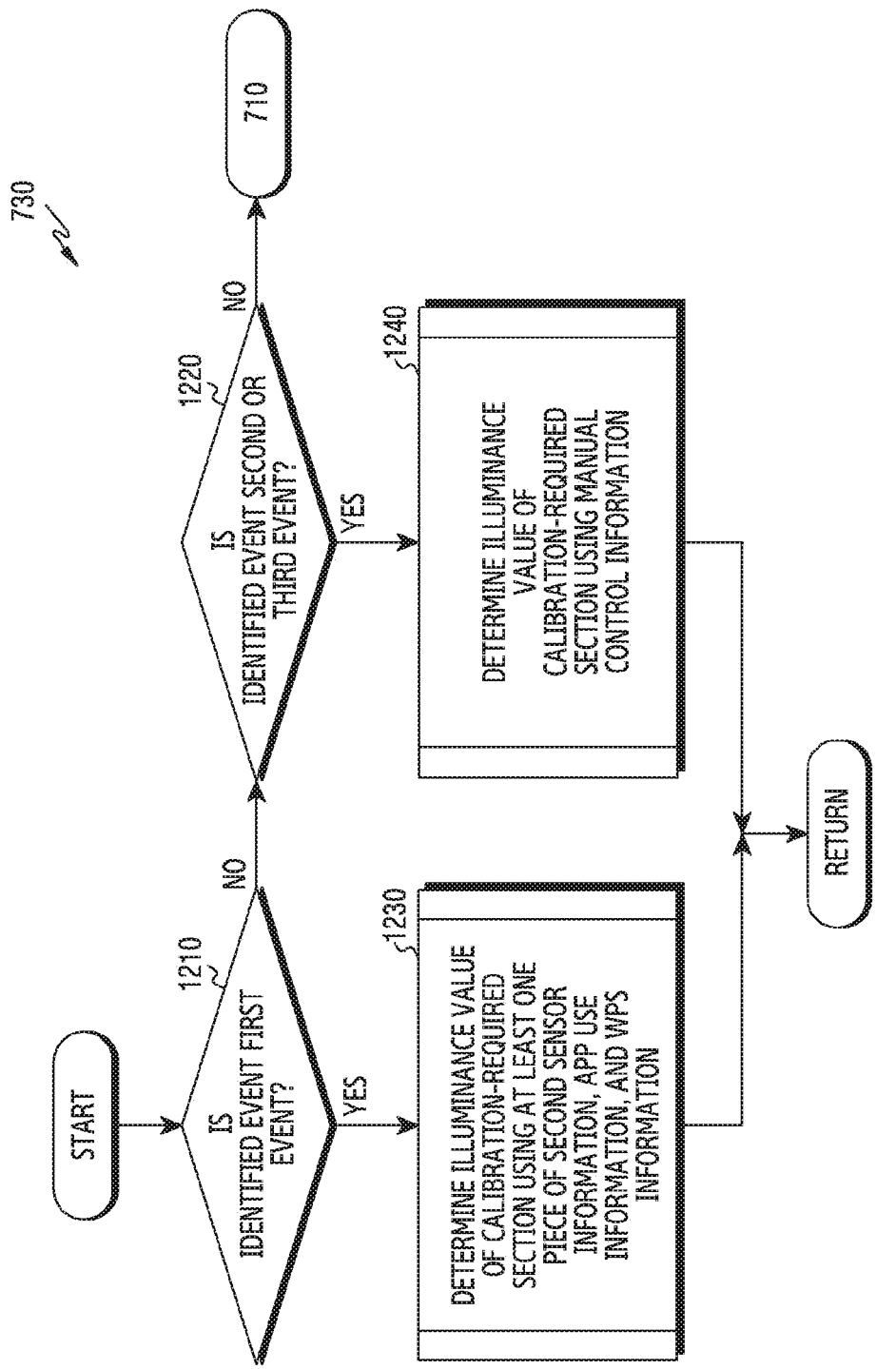
FIG. 12 is a flowchart illustrating in detail the operation in which the electronic device determines an illuminance value of the calibration-required section according to various embodiments of the disclosure.

FIG. 12 is a flowchart illustrating in detail the operation in which the electronic device determines an illuminance value of the calibration-required section according to various embodiments of the disclosure.

According to an embodiment, the operation in which the electronic device determines the illuminance value of the calibration-required section may be operation 730 of FIG. 7.

In operation 1210, the processor 620 of the electronic device may determine whether the identified event is the first event.

According to an embodiment, the first event may be an event for determining that the illuminance value of the first section is equal to or smaller than a first threshold value.

When the identified event is the first event, the processor 620 of the electronic device may determine the illuminance value of the calibration-required section based on at least one piece of second sensor information, APP use information, and Wi-Fi Positioning System (WPS) information in operation 1230.

According to an embodiment, at least one piece of the second sensor information, the APP use information, and the WPS information may be stored in the memory 650 of the electronic device.

According to an embodiment, the second sensor information may be information acquired by the second sensor. The second sensor may be a sensor different from the first sensor 210 or 310. For example, the second sensor may be at least one sensor among a temperature sensor, an olfactory sensor, a pressure sensor, and a motion sensor (for example, an acceleration sensor).

According to an embodiment, the second sensor may include the GNSS module 660.

According to an embodiment, the second sensor information may or may not correspond to the first section that is a section required to be calibrated. For example, a time point at which the second sensor information is acquired may be included in the first section. The processor 620 of the electronic device may determine the illuminance value of the first section which is the section required to be calibrated based on the second sensor information acquired through the second sensor within the first section. In another example, the time point at which the second sensor information is acquired may not be included in the first section. The processor 620 of the electronic device may determine the illuminance value of the first section which the section required to be calibrated based on the second sensor information acquired through the second sensor within the second section which is a section before the first section.

According to an embodiment, the second sensor may be activated regardless of activation of the illuminance measurement function. The second sensor may be activated in a time section in which the illuminance measurement function is deactivated. For example, the processor 620 may deactivate the illuminance measurement function in a time section in which it is generally determined that the sun sets, and the second sensor may be activated regardless of deactivation of the illuminance measurement function in the time section in which it is generally determined that the sun sets.

According to an embodiment, the processor 620 of the electronic device may assign priorities to a plurality of sensors included in the second sensor. According to an embodiment, the processor 620 of the electronic device may assign the priority based on accuracy of the plurality of sensors included in the second sensor. For example, when specifying the location of the user, the processor 620 of the electronic device may assign the highest priority to the GNSS module 660 having the highest accuracy.

According to an embodiment, the APP use information may be information on the use of an application or a program installed in the electronic device 600. For example, the APP use information may be information indicating that "a fitness management program installed in the electronic device has been executed and used by the user at 22:43 on Sep. 5, 2017".

According to an embodiment, the APP use information may or may not correspond to the first section which is the section required to be calibrated. For example, when the first section is a section from 22:40 on Sep. 5, 2017 to 22:50 on Sep. 5, 2017, the APP use information may be information indicating the execution and use by the user at 22:43 on Sep. 5, 2017 that is a time point included in the first section.

According to an embodiment, an application or a program installed in the electronic device 600 may be an application capable of estimating, when the application is executed by the user, the location of the user or the electronic device 600 according to the type of the executed application or the operation of the executed application. For example, the application may include at least one of a fitness management application, a payment application, and a messaging application.

According to an embodiment, the fitness management application may be an application for recording and managing sports activity of the user. For example, the fitness management application may include a healthcare application, an outdoor cycling application, and a golf rounding application.

For example, when the user uses an application related to outdoor jogging or outdoor cycling in at least some of the first section, the processor 620 of the electronic device may determine that the electronic device 600 is located outdoors in the first section.

In another example, when the user uses an application related to indoor jogging or indoor cycling in at least some of the first section, the processor 620 of the electronic device may determine that the electronic device 600 is located indoors in the first section.

In another example, although the term "indoor" or "outdoor" is not specified, the processor 620 of the electronic device may determine that the electronic device 600 is located indoors or outdoors in the first section according to the type of the sports activity. For example, when the user executes and uses a climbing or golf rounding application in at least some of the first section, the processor 620 of the electronic device may determine that the electronic device 600 is located indoors in the first section.

According to an embodiment, the payment application may be an application for performing payment for product or service purchase. The payment application may include an application using at least one of MST payment, NFC payment, or QR code payment. The payment application may include an application for paying for fares of public transportation including buses/subways and an application for performing payment in stores such as a department store or a movie theater. For example, when the use of a subway fare payment application by the user is detected in at least some of the first section, the processor 620 of the electronic device may determine that the user is located indoors in the first section and determine the illuminance value of the first section based on a generally known indoor illuminance value.

According to an embodiment, the messaging application may be an application through which the user exchanges a message with one or more other users. The messaging application may include a Short Message Service (SMS) application, a Multimedia Message Service (MMS) application, and a messenger application. For example, when a message indicating that the user purchases a product in a store (for example, a department store) in at least some of the first section is received, the processor 620 of the electronic device may determine that the user is located indoors in the first section and determine the illuminance value of the first section based on a generally known indoor illuminance value.

According to an embodiment, the WPS may be a location acquisition system used to specify the location in an environment (for example, an indoor environment) in which it is difficult to acquire the location through the GNSS module 660. The WPS information may include information on a signal strength for a plurality of wireless access points. For example, the processor 620 of the electronic device may determine that the user is located indoors in the first section based on signal strength information (hereinafter, referred to as WPS information) for one or more wireless access points received by the electronic device 600 in at least some of the first section and determine the illuminance value of the first section using a generally known indoor illuminance value.

According to an embodiment, the processor 620 of the electronic device may assign in advance priorities to the second sensor information, the APP use information, and the WPS information. For example, the processor 620 of the electronic device may assign the highest priority to the second sensor information and the next highest priority to the APP use information and the WPS information. However, the priorities are not absolute and may be changed based on the type of occupied sensors or the accuracy of the sensors.

According to an embodiment, if the illuminance value of the first section can be determined by information having the highest priority, the processor 620 of the electronic device may not determine the illuminance value of the first section based on the information having the lowest priority. Further, if the illuminance value of the first section cannot be determined by the information having the highest priority, the processor 620 of the electronic device may determine the illuminance value of the first section based on the information having the lowest priority. For example, when the processor 620 of the electronic device determines the illuminance value of the first section based on the GNSS module 660 among the second sensor information, the processor 620 of the electronic device may not acquire the APP use information or the WPS information or may acquire but not use the same.

According to an embodiment, the processor 620 of the electronic device may determine the location of the user using all available information among the second sensor information, the APP use information, and the WPS information regardless of the priority and determine the illuminance value of the first section based on the determined location of the user. When at two pieces of information contradict each other (for example, when the WPS information indicates that the user is located indoors in the first section and the GNSS information of the second sensor information indicates that the user is located outdoors in the first section), the illuminance value of the first section based on information having a higher priority (for example, GNSS module 660 information).

Although not illustrated, the processor 620 of the electronic device may perform operation 1240 after operation 1230. For example, when manual control input is received after the illuminance value of the calibration-required section is determined using at least one piece of the second sensor information, the APP use information, and the WPS information, the processor 620 of the electronic device may determine the illuminance value of the calibration-required section in additional consideration of the manual control input. In another example, when there is no second sensor information, APP use information, or WPS information, the processor 620 of the electronic device may determine the illuminance value of the calibration-required section using the manual control input in operation 1240.

When the identified event is not the first event, the processor 620 of the electronic device may identify whether the identified event is the second event or the third event in operation 1220.

According to an embodiment, the second event may be an event for detecting charging of the electronic device without detection of motion of the electronic device in at least some of the first section. For example, the second event may be an event for detecting reception of power from an external power source (for example, AC power source) with no motion of the electronic device in at least some of the first section.

According to an embodiment, the third event may be an event for detecting that the electronic device is not worn on the user's body in at least some of the first section. According to an embodiment, the electronic device may be a wearable device in the third event. For example, the third event may be an event for detecting release of the wearing of the wearable device which is worn on the user's body (for example, the user's wrist) in at least one some of the first section. In another example, the third event may be an event for detecting that the wearable device, which can be worn on the user's body, is not worn on the user's body in at least some of the first section.

When the identified event is the second event or the third event, the processor 620 of the electronic device may determine or estimate the illuminance of the calibration-required section using an input from an external object (for example, a user's finger) of the electronic device.

According to an embodiment, when the identified event is the second event or the third event, the processor 620 of the electronic device may determine the illuminance value of the calibration-required section using a user's manual control information (for example, a user's touch input) in operation 1240.

According to an embodiment, when the identified event is the second event or the third event, the processor 620 of the electronic device may ignore the pre-measured value of the calibration-required section (for example, the first section).

According to an embodiment, the manual control information may be a manual control input by the user. The user's manual control information may include an input for inputting information on the illuminance value of the predetermined section into the electronic device.

When the second event or the third event in the case in which the electronic device is a wearable device occurs, it is hard to say the electronic device and the user are in the same light environment due to characteristics of the event. Accordingly, the processor 620 of the electronic device cannot determine the illuminance value of the calibration-required section based on at least one piece of the second sensor information, the APP use information, and the WPS information. Therefore, the processor 620 of the electronic device may determine the illuminance value of the calibration-required section through the manual control input.

Although not illustrated, when there is no manual control information of the user, the processor 620 of the electronic device may determine the illuminance value of the calibration-required section using at least one piece of the second sensor information, the APP use information, and the WPS information.

Figure 13:
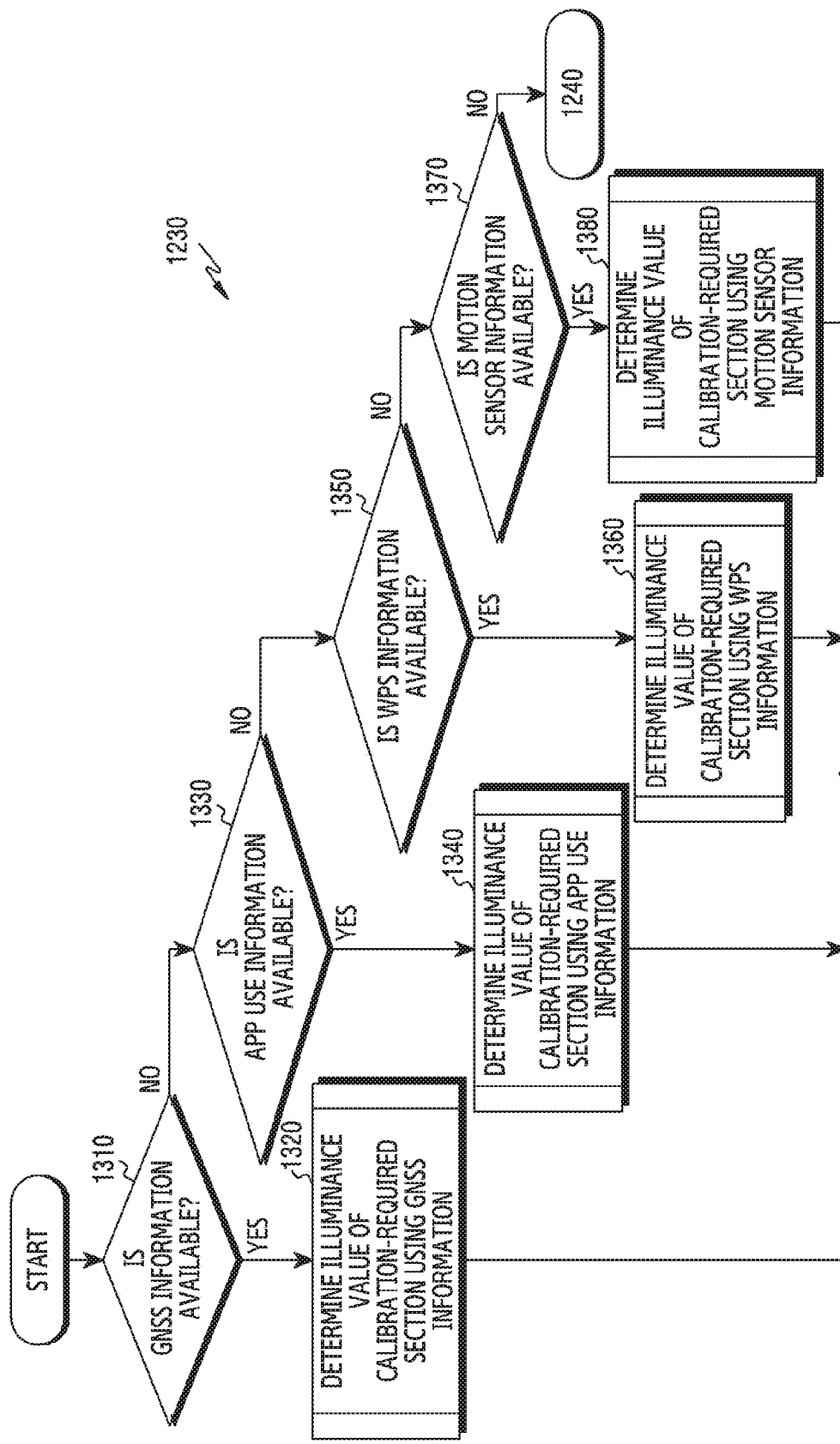
FIG. 13 is a flowchart illustrating in detail the operation in which the electronic device determines an illuminance value of the calibration-required section using at least one piece of second sensor information, APP user information, and WPS information according to various embodiments of the disclosure.

FIG. 13 is a flowchart illustrating in detail the operation in which the electronic device determines the illuminance value of the calibration-required section based on at least one piece of the second sensor information, the APP user information, and the WPS information according to various embodiments of the disclosure.

According to an embodiment, the operation in which the electronic device determines the illuminance value of the calibration-required section using at least one piece of the second sensor information, the APP use information, and the WPS information may be operation 1230 of FIG. 12.

According to an embodiment, the order (or priority) illustrated in FIG. 13 is only an example, and may be changed according to various parameters such as sensors included in the electronic device and the accuracy of the sensors, and new operation may be added.

In operation 1310, the processor 620 of the electronic device may determine whether GNSS information is available.

According to an embodiment, the processor 620 of the electronic device may determine whether GNSS information corresponding to the first section which is the calibration-required section (or measured in the first section) is stored in the memory 650.

According to an embodiment, when the GNSS information corresponding to the first section, which is the calibration-required section, is stored in the memory 650, the processor 620 of the electronic device may determine whether the stored GNSS information is accurate enough to be used for determining the illuminance value of the first section. For example, when the measurement value of the GNSS information is changed by a predetermined error or more without predetermined directivity, the electronic device may determine that the stored GNSS information is not available.

According to another embodiment, the processor 620 of the electronic device may control the GNSS module 660 to acquire the GNSS information corresponding to the first section which is the calibration-required section. For example, in response to determination that the first section is the calibration-required section, the processor 620 of the electronic device may control the GSNN module 660 to acquire the GNSS information corresponding to the first section.

When it is determined that the GNSS information is available when the GNSS information is acquired, the processor 620 of the electronic device may determine the illuminance value of the first section which is the calibration-required section based on the GNSS information in operation 1320. For example, when the GNSS information of at least some of the first section is information indicating that the electronic device is located indoors at a time point at which the GNSS information is acquired, the processor 620 of the electronic device may determine the illuminance value of the first section in consideration of a corresponding region and weather.

When it is determined that the GNSS information is not available, the processor 620 of the electronic device may determine whether the APP use information is available in operation 1330.

According to an embodiment, the processor 620 of the electronic device may determine whether information indicating that an application or a program installed in the electronic device 600 is used in at least some of the first section, which is the calibration-required section, is stored in the memory 650. For example, the processor 620 of the electronic device may determine whether information indicating that an outdoor cycling application is used by the user in at least one section included in the first section is stored in the memory 650.

When it is determined that the APP use information is available, the processor 620 of the electronic device may determine the illuminance value of the first section which is the calibration-required section based on the APP use information in operation 1340. For example, the processor 620 of the electronic device may determine that the user is located indoors based on information indicating that a subway fare payment application is used by the user in at least some of the first section and determine the illuminance value of the first section through a generally known indoor illuminance value.

When it is determined that the APP use information is not available, the processor 620 of the electronic device may determine whether the WPS information is available in operation 1350.

According to an embodiment, the processor 620 of the electronic device may determine whether signal strength information (WPS information) of one or more wireless access points received by the electronic device in at least some of the first section is stored in the memory 650.

According to another embodiment, the processor 620 of the electronic device may control the communication module 630 to acquire the signal strength information (WPS information) of one or more wireless access points corresponding to the first section which is the calibration-required section. For example, the processor 620 of the electronic device may control the communication module 630 to acquire the signal strength information of one or more wireless access points corresponding to the first section in response to determination that the first section is the calibration-required section.

When it is determined that the WPS information is available or when the WPS information is acquired, the processor 620 of the electronic device may determine the illuminance value of the first section which is the calibration-required section based on the WPS information in operation 1360. For example, the processor 620 of the electronic device may determine that the electronic device 600 is located indoors in the first section based on the signal strength information of wireless access points in at least some of the first section and determine the illuminance value of the first section using a generally known indoor illuminance value.

When it is determined that the WPS use information is not available, the processor 620 of the electronic device may determine whether the motion sensor information is available in operation 1370.

According to an embodiment, the processor 620 of the electronic device may determine whether motion sensor information of the electronic device in at least some of the first section is stored in the memory 650.

When it is determined that the motion sensor information is available, the processor 620 of the electronic device may determine the illuminance value of the first section which is the calibration-required section based on the motion sensor information.

According to an embodiment, when determining the illuminance value of the first section which is the calibration-required section, the processor 620 of the electronic device may use the motion sensor information of the first section. For example, when the motion sensor information of the first section is information indicating that the electronic device does not move at a predetermined speed or faster, the processor 620 of the electronic device may determine the illuminance value of the first section based on an illuminance value of another section (second section) close to the first section. For example, when it is determined that the illuminance value of the first section is not correct and there is no motion of the electronic device in the first section, the processor 620 of the electronic device may determine a new illuminance value of the first section as the illuminance value of the second section which is a section right before the first section. Since there is no motion or there is a little motion of the electronic device in the first section, it is reasonable that the illuminance value of the first section is similar to the illuminance value measured in the second section which is a section right before the first section.

Figure 14:
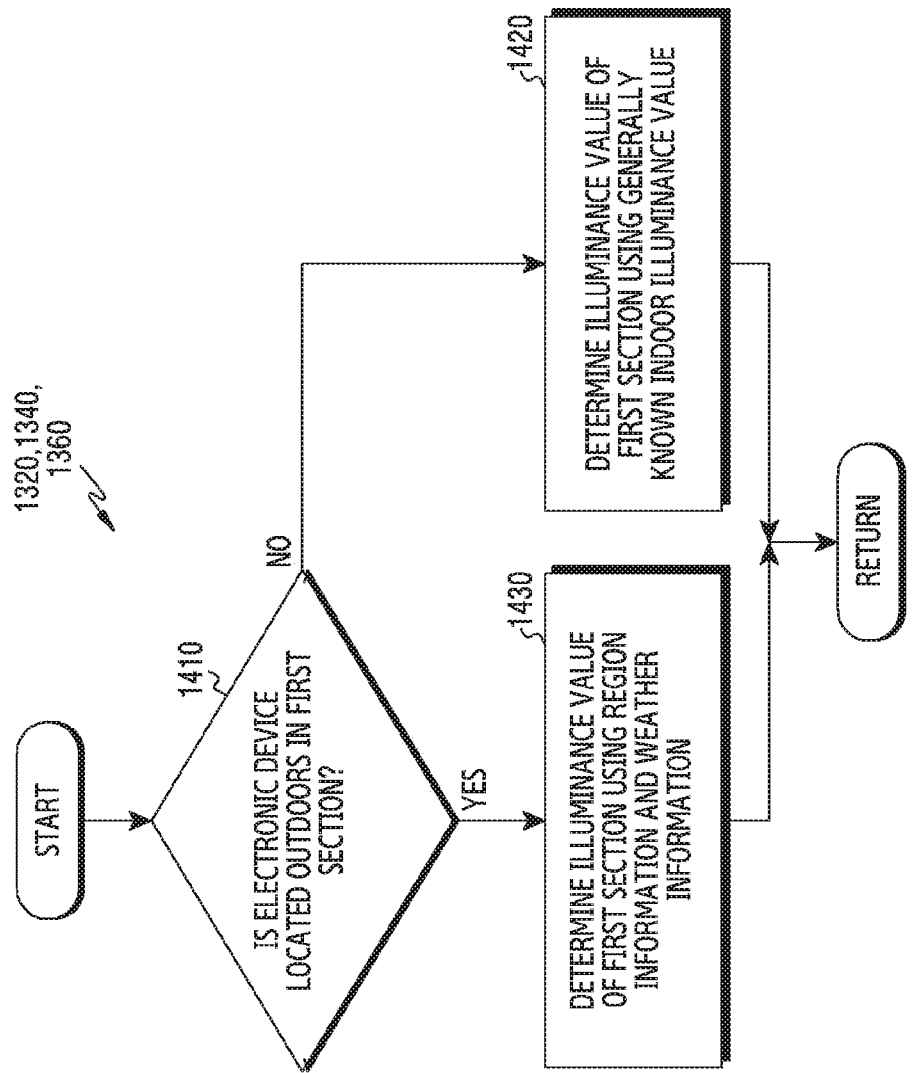
FIG. 14 is a flowchart illustrating in detail the operation in which the electronic device determines the illuminance value of the calibration-required section using GNSS information, APP use information, or WPS information according to various embodiments of the disclosure.

FIG. 14 is a flowchart illustrating in detail the operation in which the electronic device determines the illuminance value of the calibration-required section based on the GNSS information, the APP use information, or the WPS information.

According to an embodiment, the operation in which the electronic device determines the illuminance value of the calibration-required section based on the GNSS information may be operation 1320 of FIG. 13. The operation in which the electronic device determines the illuminance value of the calibration-required section based on the APP use information may be operation 1340 of FIG. 13. Last, the operation in which the electronic device determines the illuminance value of the calibration-required section based on the WPS information may be operation 1360 of FIG. 13.

In operation 1410, the processor 620 of the electronic device may determine whether the electronic device 600 is located indoors in the first section.

According to an embodiment, the processor 620 of the electronic device may determine whether the electronic device 600 is located indoors in the first section based on the GNSS information measured in at least some of the first section.

According to another embodiment, the processor 620 of the electronic device may determine whether the electronic device 600 is located indoors in the first section based on records of an application installed in the electronic device used by the user in at least some of the first section. For example, the application may include at least one of a fitness management application, a payment application, and a messaging application.

According to another embodiment, the processor 620 of the electronic device may determine whether the electronic device 600 is located outdoors in the first section based on the signal strength information of one or more wireless access points received by the electronic device 600 in at least some of the first section.

When it is determined that the electronic device 600 is located indoors in the first section, the processor 620 of the electronic device may determine the illuminance value of the first section based on region information and weather information in operation 1430.

According to an embodiment, the region information may include information on an administrative district to which the location of the electronic device belongs in the first section, and the weather information may include various pieces of information which can be used to determine the illuminance value. For example, the weather information may include cloud information, humidity information, and information on rain or snow.

According to an embodiment, the electronic device 600 may access an external device (not shown) to identify weather information for the first section and the region information. For example, the electronic device may access a weather center website to identify weather information corresponding to the first section (from 22:40 on Sep. 5, 2017 to 22:50 on Sep. 5, 2017) and region information (Gangnam-gu, Seoul, Korea).

According to an embodiment, the processor 620 of the electronic device may control the communication module 630 to transmit a signal that makes a request for identifying weather information to an external device (not shown). The electronic device may receive weather information corresponding to the request for identifying weather information from the external device.

According to an embodiment, the processor 620 of the electronic device may determine the illuminance value of the first section based on predetermined mapping information. The predetermined mapping information may be mapping information of the relationship between weather information and the illuminance value. The weather information may include information on a degree of fine weather, season, and time zone. For example, "fine morning in early summer" may be mapped to an illuminance value "15000 lux".

According to an embodiment, the processor 620 of the electronic device may determine the illuminance value of the first section based on the predetermined mapping information and the identified weather information. For example, when weather information for the first section and region information is "fine" and the first section is included in "early summer and fine morning", the processor 620 of the electronic device may search for predetermined mapping information and determine the illuminance value of the first section as "15000 lux".

According to an embodiment, the electronic device may control the communication module 630 to transmit a signal that makes a request for an illuminance value corresponding to the acquired region information and weather information to the external device. For example, the electronic device may control the communication module 630 to transmit the acquired region information and weather information and a signal that makes a request for an illuminance value corresponding to the acquired region and weather information to an external device (for example, a crowd sourcing server) that stores illuminance values transmitted by a plurality of participants who participant in crowd sourcing. The electronic device may receive the illuminance value corresponding to the acquired region and weather information from the external device. In another example, the electronic device may receive an illuminance value from a neighboring external device (a device which can be determined to be in an environment that is the same as or similar to the electronic device).

When it is determined that the electronic device is not located outdoors in the first section, the processor 620 of the electronic device may determine the illuminance value of the first section based on a generally known indoor illuminance value in operation 1420. For example, the processor 620 of the electronic device may determine the illuminance value of the first section based on a generally known indoor illuminance value range (for example, 200 lux to 1000 lux). For example, the processor 620 of the electronic device may determine that the illuminance of the first section is the average of a maximum value and a minimum value of the generally known indoor illuminance value range.

According to an embodiment, the electronic device may receive the generally known indoor illuminance value from the external device. As described above, the electronic device may control the communication module 630 to transmit a signal that makes a request for the generally known indoor illuminance value to an external device (for example, a crowd sourcing server) that stores illuminance values transmitted to a plurality of participants who participate in crowd sourcing. For example, the electronic device may transmit current place information of the electronic device (for example, the inside of department store A) and a signal that makes a request for an illuminance corresponding to the current place information of the electronic device to the crowd sourcing server and receive the requested illuminance value from the crowd souring server. According to another embodiment, the electronic device may receive the generally known indoor illuminance value or the current illuminance value from a neighboring external device.

According to an embodiment, the processor 620 of the electronic device may control the generally known indoor illuminance value range according to a business type of a building corresponding to the indoor location of the electronic device 600. According to an embodiment, when the user uses a payment application to purchase a product in a department store in at least some of the first section, the processor 620 of the electronic device may determine that the electronic device is located inside the department store in the first section. The processor 620 of the electronic device may up-control the generally known indoor illuminance value range in consideration that indoor illuminance of the department store is higher than the generally known indoor illuminance value.

Figure 15:
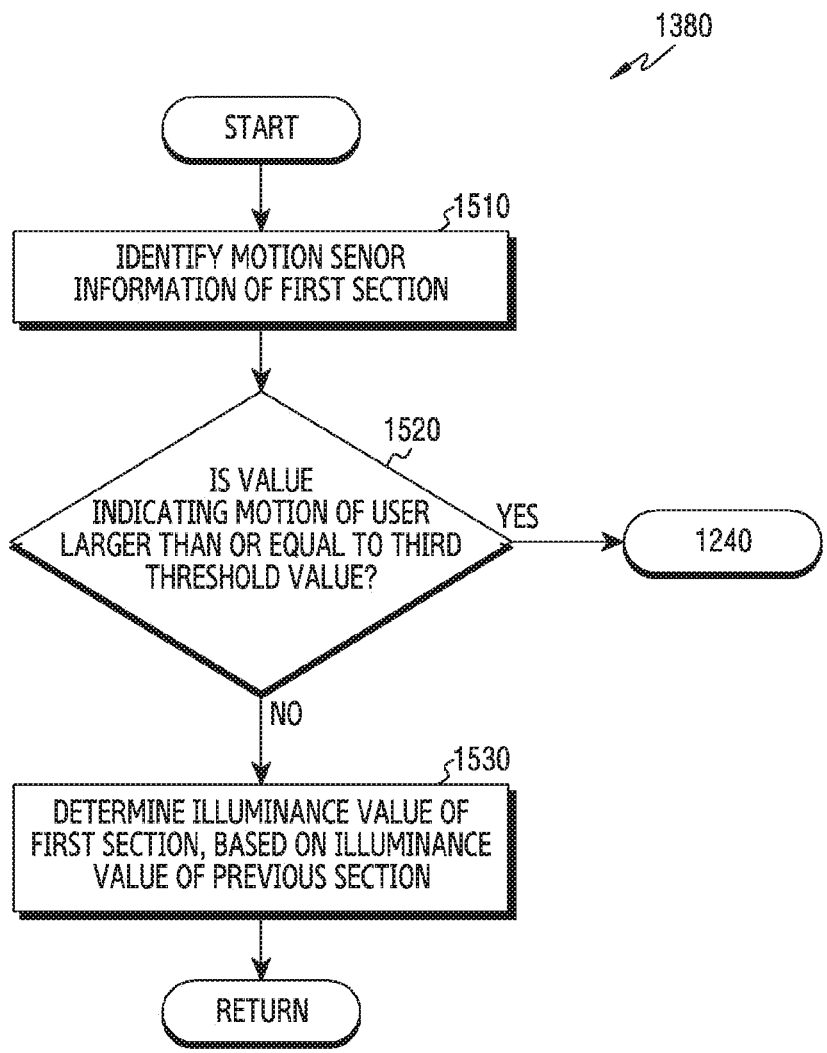
FIG. 15 is a flowchart illustrating in detail the operation in which the electronic device determines the illuminance value of the calibration-required section based on motion sensor information according to various embodiments of the disclosure.

FIG. 15 is a flowchart illustrating in detail the operation in which the electronic device determines the illuminance value of the calibration-required section based on motion sensor information according to various embodiments of the disclosure.

According to an embodiment, the operation in which the electronic device determines the illuminance value of the calibration-required section using the motion sensor information may be operation 1380 of FIG. 13.

In operation 1510, the processor 620 of the electronic device may identify motion sensor information in the first section which is the calibration-required section.

According to an embodiment, the motion sensor information in the first section may be information acquired by the motion sensor 614 in at least some of the first section.

According to an embodiment, the motion sensor information in the first section may be information periodically acquired by the motion sensor 614 in the first section, and the period on which the motion sensor information is acquired may be the same as or different from the period on which the illuminance value is measured in the first section.

According to an embodiment, the motion sensor 614 may include a predetermined sensor capable of detecting and quantifying motion of the user. For example, the motion sensor 614 may be at least one of an acceleration sensor and a gyro sensor. The processor 620 of the electronic device may determine information on an action state of the user (for example, walking or running), a degree of motion, or a strength of motion based on acceleration sensor data. The processor 620 of the electronic device may determine information on a movement path of the user, a motion path, or a displacement of movement of the user during the first section based on acceleration sensor data and gyro sensor data.

According to an embodiment, the processor 620 of the electronic device may periodically receive a value indicating motion of the user based on at least one of x, y, and z axes from the motion sensor 614.

According to an embodiment, the processor 620 of the electronic device may determine the value indicating motion of the user based on values ($(x\_k, y\_k, z\_k)$) indicating motion of the user based on the x, y, and z axes. For example, the processor 620 of the electronic device may determine that the value indicating motion of the user is a root-mean square (rms) value of $x\_k, y\_k, z\_k$. In another example, the processor 620 of the electronic device may determine that the value indicating motion of the user is a value obtained by subtracting acceleration of gravity from the rms value of $x\_k, y\_k, z\_k$.

In operation 1520, the processor 620 of the electronic device may determine whether the value indicating motion of the user is larger than or equal to a predetermined third threshold value range. According to an embodiment, the third threshold value may be a reference value for determining that there is no motion of the electronic device by the processor 620 of the electronic device. According to an embodiment, the third threshold value may be a sensing error value of the motion sensor 614. For example, when the value indicating motion of the user is larger than or equal to the third threshold value range, the processor 620 of the electronic device may determine that the electronic device 600 moves in the first section. In another example, when the value indicating motion of the user is smaller than the third threshold value, the processor 620 of the electronic device may determine that the electronic device 600 does not move in the first section.

When it is determined that the value indicating motion of the user is smaller than the predetermined third threshold value, the processor 620 of the electronic device may determine the illuminance value of the first section based on an illuminance value of a second section in operation 1530.

According to an embodiment, the second section may be a section before the first section. For example, the second section may be a just previous section of the first section.

According to an embodiment, the second section may include a plurality of sections.

According to an embodiment, the processor 620 of the electronic device may determine a value, which is the same as the illuminance value of the second section, as the illuminance value of the first section.

The reason why the processor 620 of the electronic device may determine determines the illuminance value of the first section based on the illuminance value of the second section, which is the previous section of the first section, is that it is reasonable to determine that a user environment (for example, illuminance value) is not changed since there is no motion of the electronic device in the first section.

When it is determined that the value indicating motion of the user is larger than or equal to the predetermined third threshold value range, the processor 620 of the electronic device may perform operation 1240. When it is determined that the value indicating motion of the user is larger than or equal to the predetermined third threshold value range, it is reasonable that a user environment (for example, illuminance value) is changed since the user is moving, and thus the illuminance value of the first section can be determined based on the second section.

Figure 16:
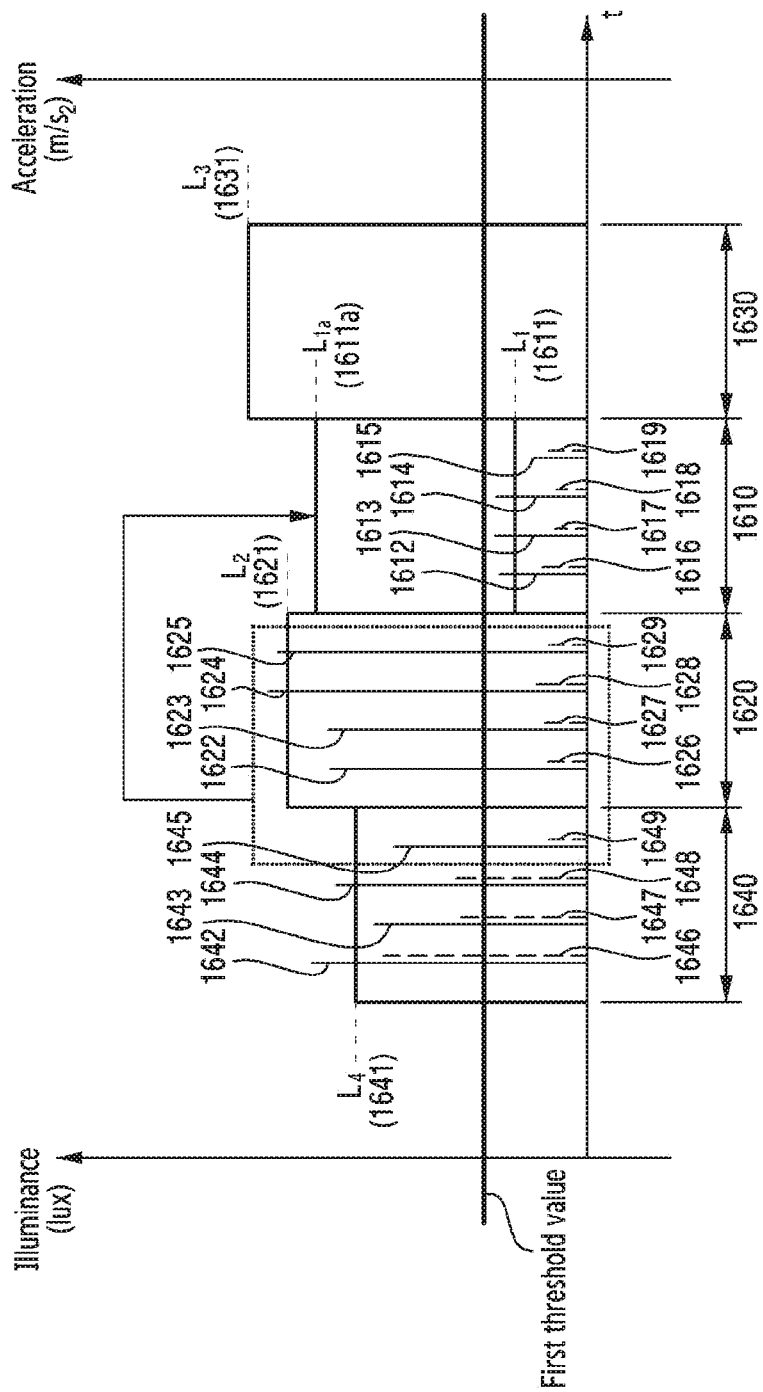
FIG. 16 illustrates an example in which the electronic device determines the illuminance value of the calibration-required section based on motion sensor information according to various embodiments of the disclosure.

FIG. 16 illustrates an example in which the electronic device determines the illuminance value of the calibration-required section based on motion sensor information according to various embodiments of the disclosure.

According to an embodiment, a plurality of time sections included in a time range in which the illuminance measurement function is activated are illustrated. The plurality of time sections may include a first section 1610, a second section 1620, a third section 1630, and a fourth section 1640.

According to an embodiment, the plurality of sections may have an illuminance value that represents each section. For example, the first section 1610 may have an illuminance value of L1 1611 that represents the first section 1610, and the second section may have an illuminance value of L2 1621 that represents the second section 1620.

According to an embodiment, the processor 620 of the electronic device may periodically acquire a plurality of illuminance measurement values corresponding to different time points within the plurality of sections. For example, the processor 620 of the electronic device may acquire a plurality of illuminance measurement values 1642, 1643, 1644, and 1645 corresponding to different time points within the fourth section 1640. The plurality of illuminance measurement values 1642, 1643, 1644, and 1645 corresponding to different time points within the fourth section 1640 may be used to determine an illuminance value of L4 1641 of the fourth section 1640.

According to an embodiment, the processor 620 of the electronic device may periodically acquire motion sensor information corresponding to different time points within the plurality of sections. For example, an acceleration sensor may acquire acceleration values 1646, 1647, 1648, and 1649 of the electronic device corresponding to four different time points within the fourth section 1620.

According to an embodiment, the time points corresponding to the plurality of illuminance measurement values may be the same as the time points corresponding to the motion sensor information. For example, the processor 620 of the electronic device may measure illuminance at the same time point and acquire acceleration information of the electronic device through the acceleration sensor. The acceleration information may be a rms value of values indicating motion of the user based on x, y, and z axes.

According to an embodiment, the processor 620 of the electronic device may detect that the illuminance value L1 1611 of the first section 1610 is equal to or smaller than the first threshold value range. The processor 620 of the electronic device may measure a value indicating whether the external object 440 is in proximity and, when the value indicating whether the external object 440 is in proximity is larger than or equal to the second threshold value range, determine the first section 1610 as the calibration-required section. When it is determined that the first section 1610 is the calibration-required section, the processor 620 of the electronic device may change the illuminance value of the first section 1610 (L1 1611->L1a 1611a) based on at least one of a plurality of illuminance values 1622, 1623, 1624, and 1625 within the second section 1620, which is the previous section of the first section 1610, or a plurality of illuminance values 1642, 1643, 1644, and 1645 within the fourth section 1640. Hereinafter, a detailed process will be described.

The processor 620 of the electronic device may identify an acceleration value of the first section 1610. The processor 620 of the electronic device may identify the acceleration value of the first section 1610 based on acquired acceleration values within the first section 1610. For example, the processor 620 of the electronic device may identify whether the average of the acceleration values 1616, 1617, 1618, and 1619 acquired within the first section 1610 is equal to or smaller than the third threshold value range.

When the acceleration value of the first section 1610 is larger than or equal to the third threshold value range, the processor 620 of the electronic device may determine that motion of the user in the first section 1610 is larger than or equal to a reference value and determine that the illuminance value of the first section 1610 cannot be determined based on the illuminance value of the previous section 1620 or 1640.

When the acceleration value of the first section 1610 is equal to or smaller than the third threshold value range, the processor 620 of the electronic device may determine that motion of the user is equal to or smaller than a reference value and determine the illuminance value of the first section 1610 based on the illuminance value of the previous section 1620 or 1640.

For example, the processor 620 of the electronic device may identify the acceleration values 1649, 1626, 1627, 1628, and 1629 which are continuous to the first section 1610 and equal to or smaller than the third threshold value range. The acceleration values 1649, 1626, 1627, 1628, and 1629 which are equal to or smaller than the third threshold value range does not need to be limited to one section but not need to be continuous to the first section 1610. If there is an acceleration value larger than or equal to the third threshold value range between the values, it means that motion of the user is detected on his/her way, it is reasonable that the user environment, for example, the illuminance value is changed. Since the illuminance value is changed, the illuminance value of the first section 1610 cannot be determined based on the illuminance value of the previous section of the first section 1610.

The processor 620 of the electronic device may determine a new illuminance value L1a 1611a of the first section based on the acceleration values 1649, 1626, 1627, 1628, and 1629 which are continuous to the first section 1610 and equal to or smaller than the third threshold value range. For example, the processor 620 of the electronic device may determine that the average of illuminance values 1645, 1622, 1623, 1624, and 1625 acquired at time points corresponding to the acceleration values 1649, 1626, 1627, 1628, and 1629 which are equal to or smaller than the third threshold value range is the new illuminance value L1a 1611a of the first section.

Although FIG. 16 illustrates only an embodiment of changing the illuminance value of the first section 1610 based on the acceleration values 1616, 1617, 1618, and 1619 acquired within the first section 1610, the processor 620 of the electronic device may change the illuminance value of the first section 1610 based on at least one of acceleration values acquired within the first section 1610 or gyro sensor values acquired within the first section 1610. For example, the processor 620 of the electronic device may determine that a displacement value indicating movement of the user during the first section 1610 is smaller than a reference value based on the acceleration values and the gyro sensor values. When the displacement value indicating movement of the user during the first section 1610 is smaller than the reference value, the processor 620 of the electronic device may determine the illuminance value of the first section 1610 based on the illuminance value of the previous section 1620 or 1640.

Figure 17A:
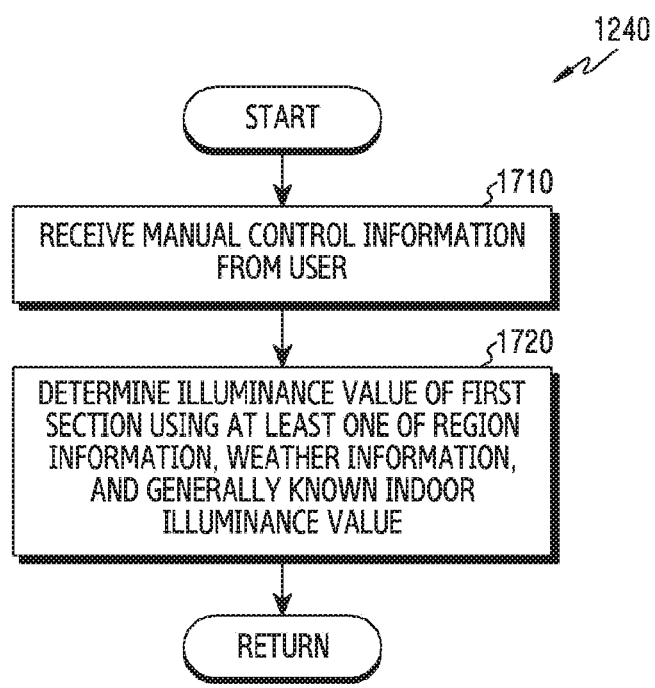
FIG. 17A is a flowchart illustrating in detail the operation in which the electronic device determines the illuminance value of the calibration-required section based on manual control information according to various embodiments of the disclosure.

FIG. 17A is a flowchart illustrating in detail the operation in which the electronic device determines the illuminance value of the calibration-required section based on manual control information according to various embodiments of the disclosure.

According to an embodiment, the operation in which the electronic device determines the illuminance value of the calibration-required section based on manual control information may be operation 1240 of FIG. 12.

In operation 1710, the processor 620 of the electronic device may receive manual control input from the user.

According to an embodiment, the processor 620 of the electronic device may control the display 640 to display a user interface for receiving the manual control information from the user on the screen and receive the manual control input from the user through the displayed user interface.

The processor 620 of the electronic device may provide (for example, display) an interface for receiving user input to specify a section of which an illuminance value is manually determined to the user. For example, the processor 620 of the electronic device may control the display 640 to display a sunshine analysis screen of FIG. 17B on the screen.

The sunshine analysis screen may include an illuminance histogram 1730. The illuminance histogram 1730 may include one or more calibration-required sections 1732 and 1734. Illuminance values corresponding to one or more calibration-required sections 1732 and 1734 may not have been determined. The processor 620 of the electronic device may receive the manual control input (for example, a touch or a drag) for selecting at least one of the one or more calibration-required sections 1732 and 1734 displayed on the illuminance histogram 1730.

When the manual control information for selecting at least one calibration-required section is received, the processor 620 of the electronic device may provide (for example, display) an interface for receiving user input to determine a situation related to an ambient light of the selected calibration-required section to the user. For example, the processor 620 of the electronic device may control the display 640 to display a drop down menu 1740 of FIG. 17B on the screen. The processor 620 of the electronic device may receive user input for selecting one category 1744 from a plurality of categories 1742 to 1748 displayed in the drop down menu 1740.

Although not illustrated, the processor 620 of the electronic device may provide (for example, display) the user with a user interface that makes a request for determining the illuminance value of the selected calibration-required section to the user in response to determination of the calibration-required section.

In operation 1720, the processor 620 of the electronic device may determine the illuminance value of the first section based on at least one of region information, weather information, and the generally known indoor illuminance value.

According to an embodiment, the processor 620 of the electronic device may determine the illuminance value of the first section according to the manual control input received in operation 1710.

Figure 17B:
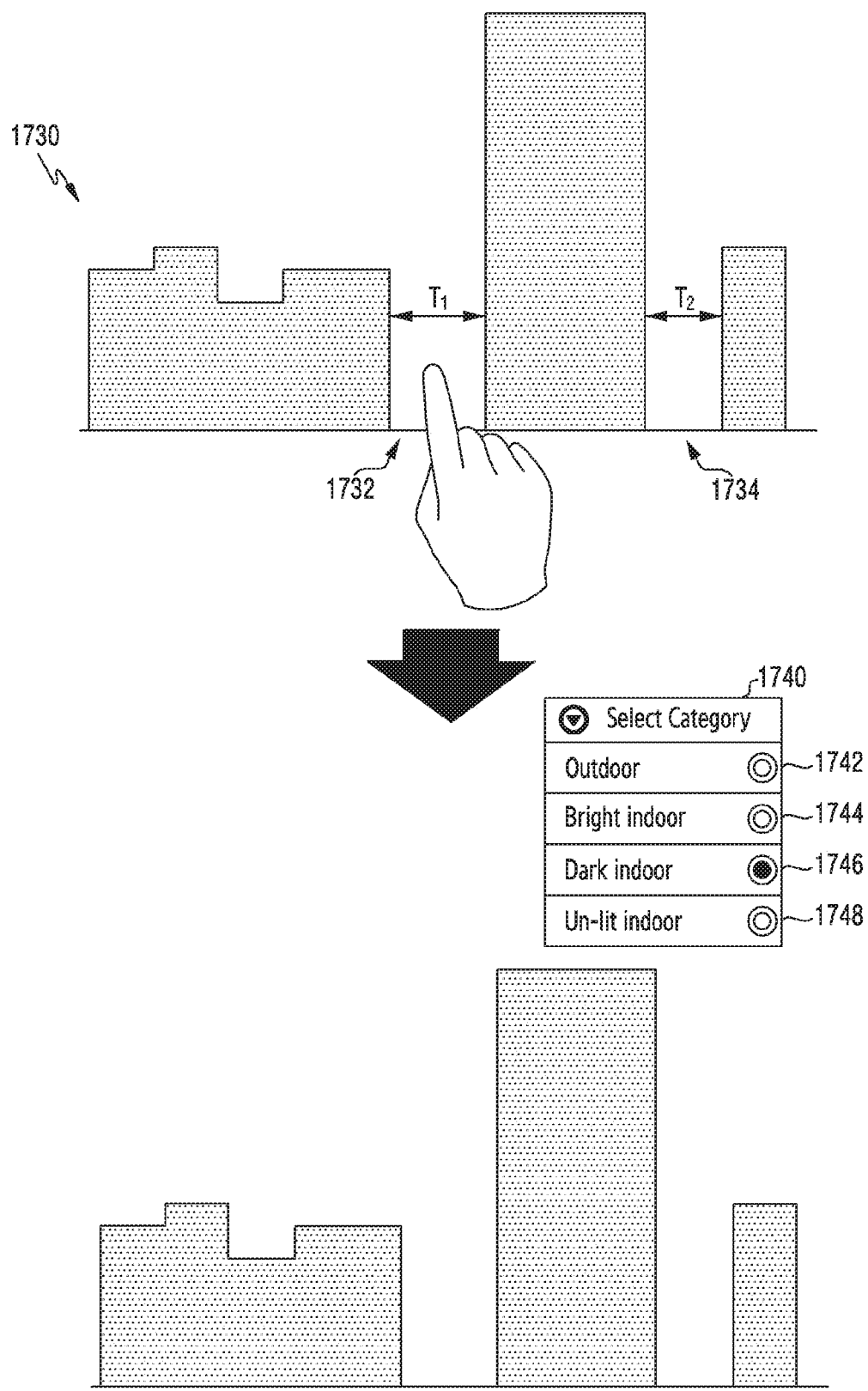
FIG. 17B illustrates an example of a user interface for receiving a manual control information from the user according to various embodiments of the disclosure.

For example, when a user selection of "outdoor" 1742 in the drop down menu 1740 of FIG. 17B is received, the processor 620 of the electronic device may determine the illuminance value of the first section based on weather information. Specifically, the processor 620 of the electronic device may determine region information based on location information of the electronic device, acquire weather information based on the region information, and determine the illuminance value of the first section based on the weather information and predetermined mapping information.

In another example, when a user selection of "bright indoor" in the drop down menu 1740 of FIG. 17B is received, the processor 620 of the electronic device may determine the illuminance value of the first section based on a generally known bright indoor illuminance value (for example, 800 lux to 1000 lux).

Figure 18:
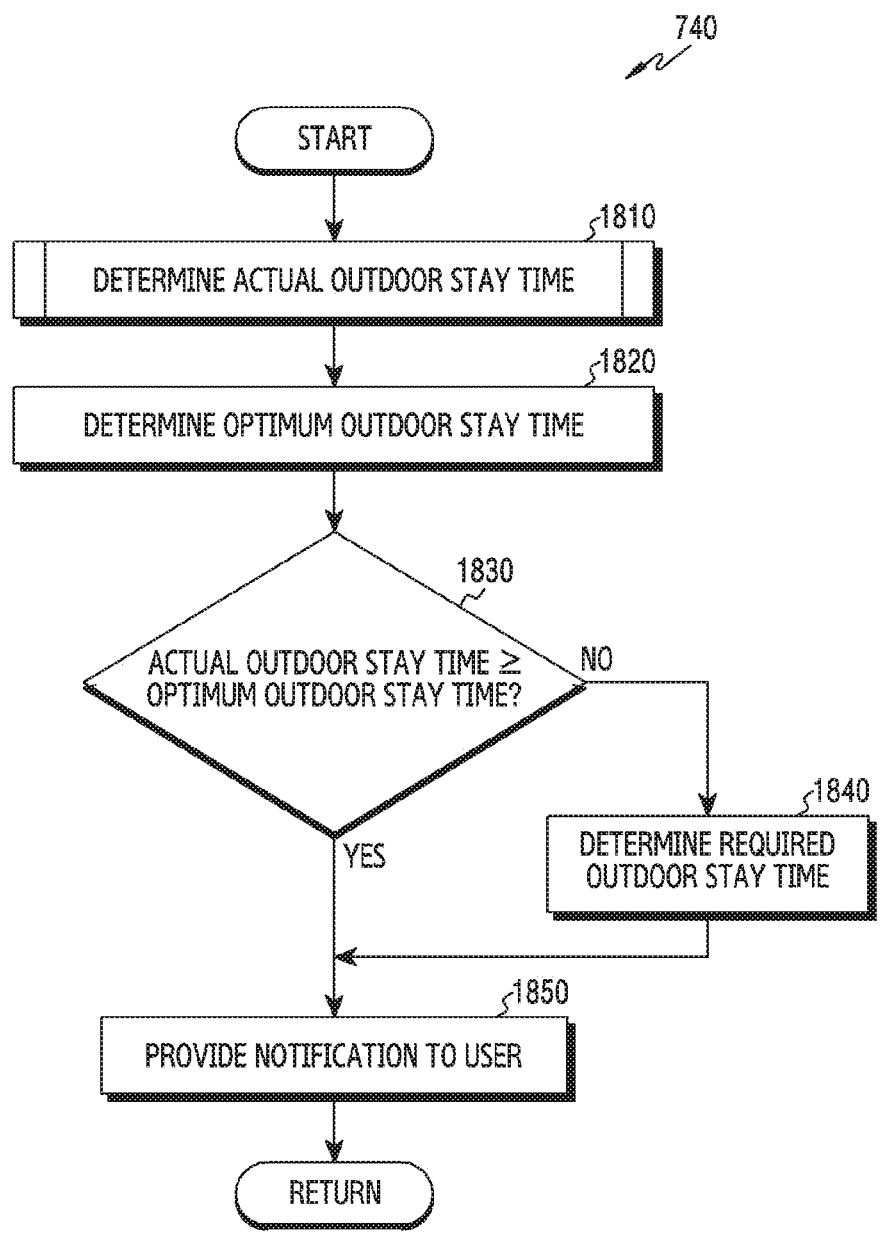
FIG. 18 is a flowchart illustrating in detail the operation in which the electronic device analyzes sunshine information and provides the analyzed sunshine information to the user according to various embodiments of the disclosure.

FIG. 18 is a flowchart illustrating in detail the operation in which the electronic device analyzes sunshine information and provides the analyzed sunshine information to the user according to various embodiments of the disclosure.

According to an embodiment, the operation in which the electronic device analyzes sunshine information and provides the analyzed sunshine information to the user may be operation 740 of FIG. 7.

According to an embodiment, the operation of FIG. 18 may be performed after illuminance values of one or more calibration-required sections are determined based on at least one of the above-described various methods.

In operation 1810, the processor 620 of the electronic device may determine an actual outdoor stay time.

According to an embodiment, the processor 620 of the electronic device may determine the actual outdoor stay time based on illuminance values of one or more sections corresponding to one time unit (for example, year, month, week, or day). For example, the processor 620 of the electronic device may determine sections corresponding to an illuminance value larger than or equal to a predetermined threshold value range among one or more sections belonging to one day (for example, yesterday). The processor 620 of the electronic device may determine the actual outdoor stay time based on the determined sections. For example, when the determined sections are 100 and one section corresponds to a time section of 5 minutes, the processor 620 of the electronic device may determine that the actual outdoor stay time of the user yester is 500 minutes.

In operation 1820, the processor 620 of the electronic device may determine an optimum outdoor stay time.

According to an embodiment, the processor 620 of the electronic device may determine the optimum outdoor stay time of the user based on a UV index of a skin type and a region of the user configured by the user. For example, the processor 620 of the electronic device may determine the optimum outdoor stay time of the user with reference to predetermined mapping information. The predetermined mapping information may be a table including the optimum outdoor stay time determined according to the UV index of the skin type of the user and the region of the user. Referring to FIG. 20, the skin type of the user may be classified into 5 types 2020 (skin types I, II, III, IV, and V) according to how easily the skin exposed to the sun burns and how easily the skin exposed to the sun tans. Further, the UV index may be classified into 4 stages 2010. In the predetermined mapping information, the optimum outdoor stay time of the user may be determined according to the skin type of the user and the UV index. For example, when the UV index is 4 and the skin type of the user corresponds to skin type IV, the optimum outdoor stay time may be determined to be 30 to 40 minutes.

According to an embodiment, the optimum outdoor stay time of the user may be determined in association with vitamin D synthesis. For example, the optimum outdoor stay time of the user may be determined as an outdoor stay time required for an enough amount of vitamin D synthesis.

In operation 1830, the processor 620 of the electronic device may compare the actual outdoor stay time with the optimum outdoor stay time.

When the actual outdoor stay time is longer than the optimum outdoor stay time, the processor 620 of the electronic device may provide (for example, display) a notification message to the user in operation 1850. For example, the processor 620 of the electronic device may control the display 640 to display a message of "You were sufficiently exposed to the sun yesterday for vitamin D synthesis" on the screen to show the same to the user. In another example, the processor 620 of the electronic device may control the display 640 to additionally display values for the optimum outdoor stay time and the actual outdoor stay time on the screen.

According to an embodiment, the optimum outdoor stay time may be a range having an upper limit and a lower limit. When the actual outdoor stay time is longer than the upper limit of the optimum outdoor stay time, the processor 620 of the electronic device may inform the user of the corresponding fact. For example, the processor 620 of the electronic device may output a warning message indicating refraining from being excessively exposed to the sun on the screen.

When the actual outdoor stay time is shorter than the optimum outdoor stay time, the processor 620 of the electronic device may determine a required outdoor stay time in operation 1840. For example, the processor 620 of the electronic device may determine the required outdoor stay time by subtracting the actual outdoor stay time from the optimum outdoor stay time. In another example, the processor 620 of the electronic device may determine the required outdoor stay time with reference to predetermined mapping information.

After determining the required outdoor stay time, the processor 620 of the electronic device may provide (for example, display) a notification message to the user in operation 1850. For example, the processor 620 of the electronic device may control the display 640 to display information on the required outdoor stay time to achieve the optimum outdoor stay time.

Figure 19:
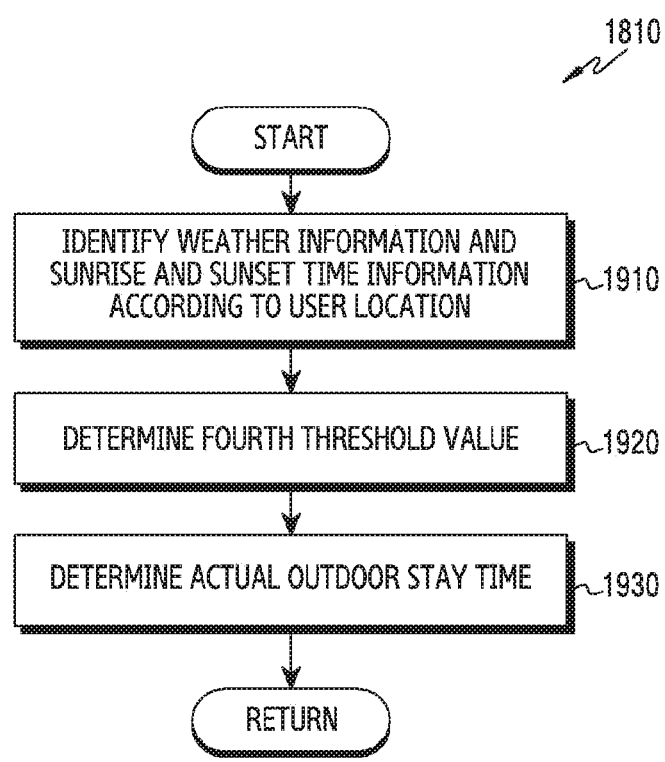
FIG. 19 is a flowchart illustrating in detail the operation in which the electronic device determines an actual outdoor stay time according to various embodiments of the disclosure.

FIG. 19 is a flowchart illustrating in detail the operation in which the electronic device determines the actual outdoor stay time according to various embodiments of the disclosure.

According to an embodiment, the operation in which the electronic device determines the actual outdoor stay time may be operation 1810 of FIG. 18.

In operation 1910, the processor 620 of the electronic device may identify weather information, sunrise time information, and sunset time information according to the user location. For example, the processor 620 of the electronic device may access an external device (for example, a weather center website) to identify the sunrise time and the sunset time according to the user location and acquire information on the sunrise time and the sunset time according to the user location from the accessed external device (for example, a weather center website).

Although not illustrated, the processor 620 of the electronic device may acquire weather information according to the user location. For example, the user may acquire information indicating that weather in a region in which the user is located is cloudy or information indicating clouds from the external device.

In operation 1920, the processor 620 of the electronic device may determine a fourth threshold value for determining "outdoor".

According to an embodiment, the fourth threshold value may be a predetermined illuminance value which may be determined to be "outdoor".

According to an embodiment, the processor 620 of the electronic device may determine the fourth threshold value based on the weather information acquired in operation 1910. For example, when the weather information acquired in operation 1910 is "cloudy", the processor 620 of the electronic device may configure the fourth threshold value to be low. In another example, when the weather information acquired in operation 1910 is "fine", the processor 620 of the electronic device may configure the fourth threshold value to be high.

In operation 1930, the processor 620 of the electronic device may determine the actual outdoor stay time.

According to an embodiment, the processor 620 of the electronic device may determine the actual outdoor stay time based on the sunrise and sunset time information acquired in operation 1910 and the fourth threshold value determined in operation 1920. For example, processor 620 of the electronic device may extract one or more sections between the sunrise time and the sunset time acquired in operation 1910 from one or more sections corresponding to one time unit (for example, year, month, week, and day) and determine one or more sections having an illuminance value larger than or equal to the fourth threshold value among the extracted one or more sections. The processor 620 of the electronic device may determine the actual outdoor stay time based on the determined one or more sections. For example, when the determined sections are 100 and one section corresponds to a time section of 5 minutes, the processor 620 of the electronic device may determine that the actual outdoor stay time of the user yester is 500 minutes.

Figure 21:
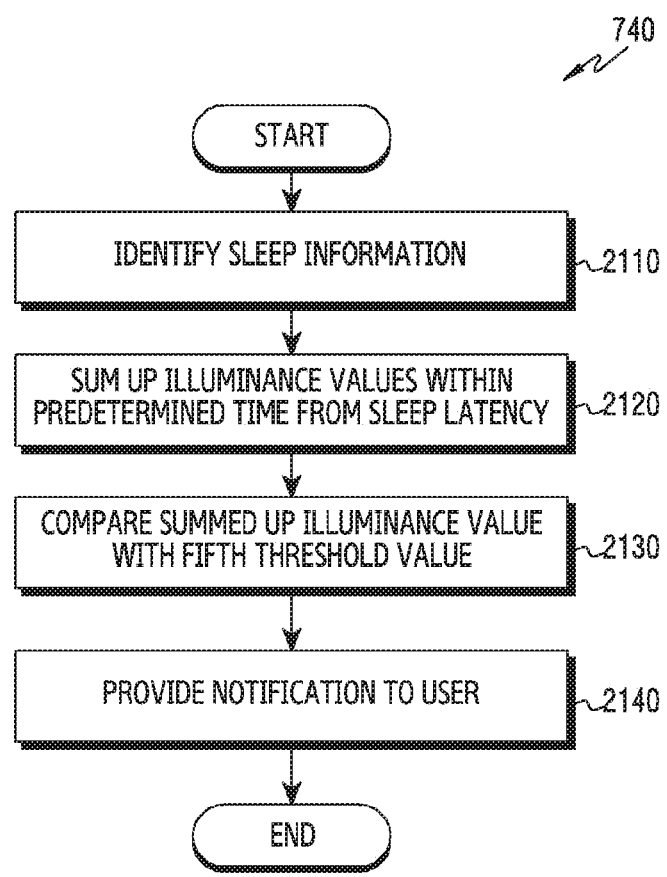
FIG. 21 is a flowchart illustrating in detail the operation in which the electronic device analyzes sunshine information and provides the analyzed sunshine information to the user according to various embodiments of the disclosure.

FIG. 21 is a flowchart illustrating in detail the operation in which the electronic device analyzes sunshine information and provides the analyzed sunshine information to the user according to various embodiments of the disclosure.

According to an embodiment, the operation in which the electronic device analyzes sunshine information and provides the analyzed sunshine information to the user may be operation 740 of FIG. 7.

In operation 2110, the processor 620 of the electronic device may identify sleep information. According to an embodiment, the memory 650 may store sleep pattern information of the user within a predetermined time range (for example, one month).

The processor 620 of the electronic device may identify sleep information of the user within a predetermined time range (for example, last week) of the user based on the sleep pattern information of the user stored in the memory 650. For example, the processor 620 of the electronic device may identify sleep latency of the user last week.

In operation 2120, the processor 620 of the electronic device may sum up illuminance values within a predetermined time from the sleep latency.

According to an embodiment, the processor 620 of the electronic device may determine corresponding one or more sections within the predetermined time from the sleep latency among one or more sections included in the predetermined time range (for example, last week). For example, one or more sections corresponding to one hour from the sleep latency on each date during one week from Sep. 4, 2017 to Sep. 10, 2017. The processor 620 of the electronic device may sum up illuminance values of the determined one or more sections. The processor 620 of the electronic device may sum up corresponding illuminance values within one hour from the sleep latency on each date.

In operation 2130, the processor 620 of the electronic device may compare the summed up illuminance value with a fifth threshold value.

According to an embodiment, the fifth threshold value may be an illuminance value that is known as not interrupting sleep before the user falls asleep. The fifth threshold value may be determined in association with melatonin hormone synthesis. For example, the fifth threshold value may be an illuminance value before initiation of sleep, required for synthesis of enough melatonin hormone during sleep.

In operation 2140, the processor 620 of the electronic device may provide (for example, display) a notification to the user based on the comparison result in operation 2130.

According to an embodiment, when a ratio of dates on which the summed up illuminance value is larger than or equal to the fifth threshold value range is larger than or equal to a predetermined ratio, the processor 620 of the electronic device may display, on the screen, a warning message indicating that the illuminance value before initiation of sleep is too bright and thus the user cannot get a deep sleep within a predetermined time range in many cases. For example, when the ratio of dates on which the summed up illuminance value is larger than or equal to the fifth threshold value range is larger than 50% within the predetermined time range (for example, last week), the electronic device may display a warning message on the screen. For example, the electronic device may display a warning message indicating that there is a need to refraining from using the electronic device within the predetermined time or control a brightness of the electronic device.

According to an embodiment, the processor 620 of the electronic device may additionally provide (for example, display) information indicating how much the illuminance value should be reduced before initiation of sleep in order to get a deep sleep and synthesize an enough amount of melatonin hormone during sleep.

According to an embodiment, when the ratio of dates on which the summed up illuminance value is larger than or equal to the fifth threshold value range is smaller than a predetermined ratio, the processor 620 of the electronic device may provide a notification indicating that a sleep pattern of the predetermined time range (for example, last week) is positive.

Figure 22:
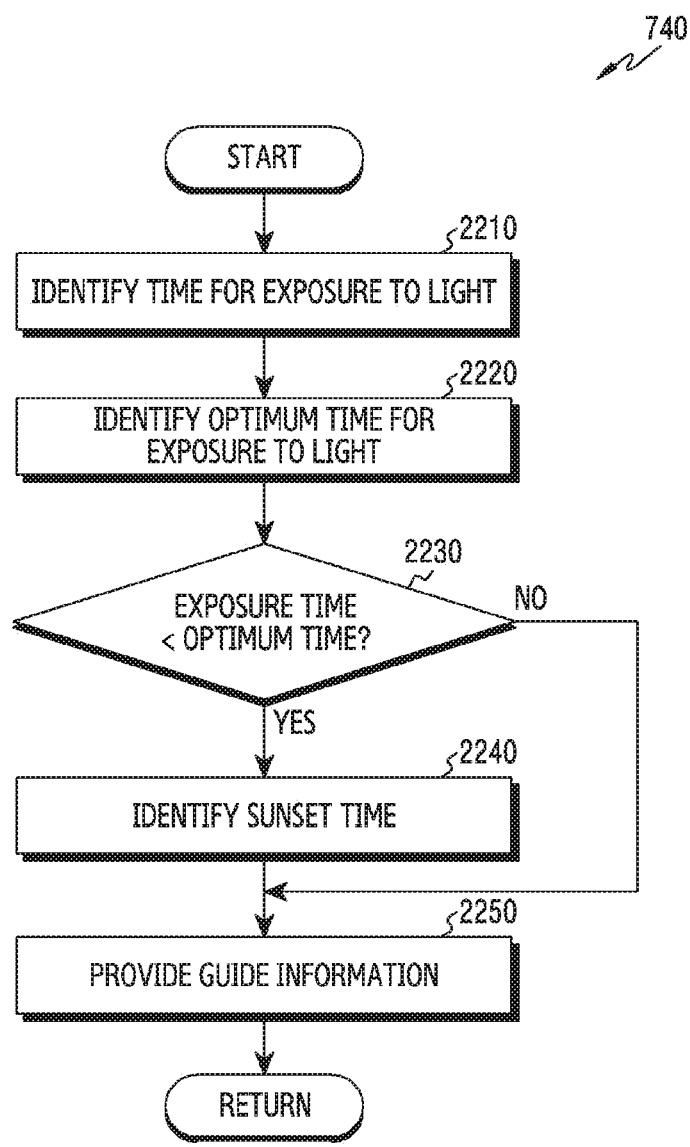
FIG. 22 is a flowchart illustrating in detail the operation in which the electronic device analyzes sunshine information and provides the analyzed sunshine information to the user according to various embodiments of the disclosure.

FIG. 22 is a flowchart illustrating in detail the operation in which the electronic device analyzes sunshine information and provides the analyzed sunshine information to the user according to various embodiments of the disclosure.

According to an embodiment, the operation in which the electronic device analyzes sunshine information and provides the analyzed sunshine information to the user may be operation 740 of FIG. 7.

According to an embodiment, the operation of FIG. 22 may be performed after illuminance values of one or more calibration-required sections are determined based on at least one of the above-described various methods.

In operation 2210, the processor 620 of the electronic device may identify a time during which the user is exposed to the light. According to an embodiment, the processor 620 of the electronic device may identify a time during which the user is exposed to the light for a predetermined time (for example, one day). According to an embodiment, operation 2210 may be performed after sunrise before sunset.

According to an embodiment, the processor 620 of the electronic device may determine the time during which the user is exposed to the light based on illuminance values of one or more sections corresponding to a time section from the sunrise time to the current time. For example, the processor 620 of the electronic device may determine a time during which the user is exposed to natural light based on illuminance values larger than or equal to a predetermined value among the illuminance values of one or more sections corresponding to the time section from the sunrise time to the current time.

In operation 2220, the processor 620 of the electronic device may identify an optimum time for exposure to the light. According to an embodiment, the processor 620 of the electronic device may identify the optimum time for exposure to the light for a predetermined time (for example, one day). For example, the processor 620 of the electronic device may identify the optimum time for exposure to the light based on a region of the user and a skin type of the user.

In operation 2230, the processor 620 of the electronic device may identify whether the exposure time is shorter than the optimum time.

When it is identified that the exposure time is shorter than the optimum time, the processor 620 of the electronic device may identify the sunset time in operation 2240 and provide (for example, display) guide information in operation 2250. According to an embodiment, the processor 620 of the electronic device may provide the user with information on the exposure time required for securing the optimum exposure time along with the remaining time to the identified sunset time from the current time.

When it is identified that the exposure time is longer than the optimum time, the processor 620 of the electronic device may provide guide information in operation 2250 without identifying the sunset time. According to an embodiment, the processor 620 of the electronic device may provide information indicating that the optimum time during which the user should be exposed to the light today has been already secured.

Figure 23:
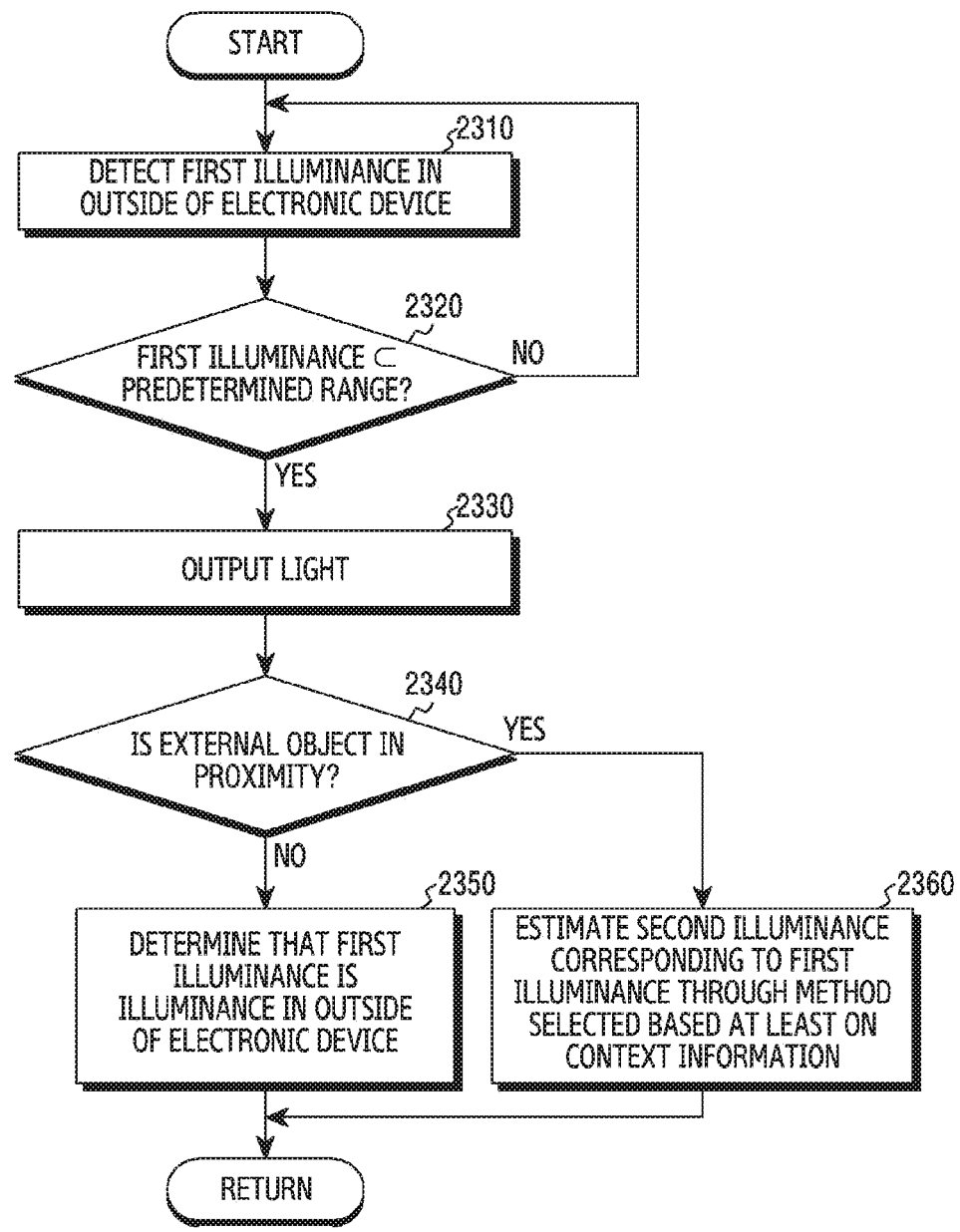
FIG. 23 is a flowchart illustrating the operation in which the electronic device determines or estimates illuminance outside of the electronic device according to various embodiments of the disclosure.

FIG. 23 is a flowchart illustrating the operation in which the electronic device determines or estimates illuminance outside of the electronic device according to various embodiments of the disclosure.

In operation 2310, the processor 620 of the electronic device may detect a first illuminance. According to an embodiment, the processor 620 of the electronic device may detect the first illuminance through the first sensor 210 or 310. According to an embodiment, operation 2310 may be periodically performed while an illuminance measurement function is activated.

In operation 2320, the processor 620 of the electronic device may determine whether the first illuminance is within a predetermined range. According to an embodiment, the processor 620 of the electronic device may determine whether the first illuminance is equal to or smaller than a first threshold value range. The first threshold value may be a reference value for distinguishing the case in which the electronic device does not directly receive the sun and the case in which the electronic device directly receives the sun.

When the first illuminance is within the predetermined range, the processor 620 of the electronic device may output the light in operation 2330. According to an embodiment, the processor 620 of the electronic device may activate the light emitter 410 and periodically output the light having a predetermined wavelength and a constant intensity through the activated light emitter 410.

When the first illuminance is not within the predetermined range, the processor 620 of the electronic device may detect the first illuminance outside of the electronic device in operation 2310. In other words, the processor 620 of the electronic device may periodically detect the first illuminance outside of the electronic device until the first illuminance within the predetermined range is detected.

In operation 2340, the processor 620 of the electronic device may identify whether an external object is in proximity. According to an embodiment, the processor 620 of the electronic device may identify whether the external object 440 is in proximity to the first sensor 210 or 310 by measuring the distance between the first sensor 210 or 310 and the external object 440.

When it is determined that the external object is not in proximity, the processor 620 of the electronic device may determine the first illuminance as illuminance outside of the electronic device in operation 2350. The processor 620 of the electronic device may determine the first illuminance detected through the first sensor 210 or 310 as actual illuminance outside of the electronic device.

When it is determined that the external object is in proximity, the processor 620 of the electronic device may estimate a second illuminance corresponding to the first illuminance through a method selected at least based on context information in operation 2360.

According to an embodiment, the processor 620 of the electronic device may use at least one piece of GNSS information, APP use information, WPS information, and motion sensor information at least based on context information. For example, when the GNSS information is available, the processor 620 of the electronic device may estimate the second illuminance corresponding to the first illuminance based on the GNSS information. In another example, when the GNSS information is not available but the APP use information is available, the processor 620 of the electronic device may estimate the second illuminance corresponding to the first illuminance based on the APP use information.

Embodiments in the specification and drawings present specific examples to easily describe the disclosure and help understanding, but do not limit the scope of the disclosure. Therefore, it should be construed such that not only the embodiments disclosed herein but also all modifications or modification forms derived based on the technical idea of the disclosure are included in the scope of the disclosure.

The invention claimed is:

1. An electronic device comprising:
    a sensor comprising a light emitter and a light receiver; and
    a processor electrically connected to the sensor,
    wherein the processor is configured to:
        detect a first illuminance outside of the electronic device through the sensor,
        output a light through the light emitter when the first illuminance is within a predetermined range,
        identify whether an external object is in proximity through the sensor, based at least on the light output through the light emitter,
        determine the first illuminance as illuminance outside of the electronic device when the external object is not in proximity, and
        when the external object is in proximity, change a mode of operation of the electronic device, and
        estimate a second illuminance corresponding to the first illuminance based on the changed mode of operation.

2. The electronic device of claim 1, further comprising a location information acquisition module,
    wherein the processor is configured to estimate the second illuminance, further based on location information acquired through the location information acquisition module.

3. The electronic device of claim 1, further comprising a motion sensor,
    wherein the processor is configured to estimate the second illuminance, based at least on motion of the electronic device acquired through the motion sensor.

4. The electronic device of claim 1, further comprising a display configured to provide a user interface,
    wherein the processor is configured to estimate the second illuminance, based at least on a user input made through the user interface.

5. The electronic device of claim 2, further comprising a memory,
    wherein the processor is configured to estimate the second illuminance, further based on location information acquired, based at least on use information related to one or more predetermined application among applications stored in the memory.

6. The electronic device of claim 2, further comprising a memory,
    wherein the processor is configured to estimate the second illuminance, further based on information related to signal intensity of one or more wireless access points stored in the memory.

7. The electronic device of claim 2, wherein the processor is configured to:
    determine a location of the electronic device, based on the location information,
    estimate the second illuminance using region information or weather information related to an outdoor location when it is determined that the location is the outdoor location, and
    estimate the second illuminance using an illuminance value related to an indoor location when it is determined that the location is the indoor location.

8. The electronic device of claim 3, wherein, when a value related to motion of the electronic device acquired through the motion sensor is smaller than a predetermined range value, the processor is configured to estimate the second illuminance, based on third illuminance detected before the first illuminance is detected.

9. The electronic device of claim 1, wherein the processor is configured to:
    determine sunshine information within a predetermined time range, based on a plurality of illuminances including the second illuminance, and
    provide the determined sunshine information to a user.

10. The electronic device of claim 9, further comprising a memory,
    wherein the processor is configured to provide information on a sunlight to which the user is required to be additionally exposed based on the sunshine information within the predetermined time range and skin information of the user stored in the memory.

11. An electronic device comprising:
    a first sensor comprising a light receiver; and
    a processor electrically connected to the sensor,
    wherein the processor is configured to:
        detect a first illuminance outside of the electronic device at a first time point through the first sensor,
        detect generation of a calibration-required section identification event within a predetermined range from the first time point, and
        estimate a second illuminance corresponding to the first illuminance through a method selected based on a type of the generated event as calibration-required section identification.

12. The electronic device of claim 11, wherein the event includes a first event for detecting that the first illuminance is within a predetermined range, a second event for detecting that the electronic device is being charged while there is no motion of the electronic device detected, and a third event for detecting that the electronic device is not worn at least a part of the body, and the method uses at least one of a second sensor, application use information, WPS information, or a manual control input.

13. The electronic device of claim 12, wherein the second sensor comprises at least one sensor among a GNSS module or a motion sensor.

14. The electronic device of claim 12, further comprising a light emitter,
    wherein, when the generated event is the first event, the processor is configured to:
        output a light through the light emitter,
        identify whether an external object is in proximity through the first sensor, based at least on the light output through the light emitter, and
        estimate the second illuminance using at least one of the second sensor, the application use information, or the WPS information when the external object is in proximity.

15. The electronic device of claim 12, wherein, when the generated event is the second event or the third event, the processor is configured to estimate the second illuminance using an input from an external object of the electronic device.

* * * * *